US008434148B2

(12) United States Patent
Teo

(10) Patent No.: US 8,434,148 B2
(45) Date of Patent: Apr. 30, 2013

(54) SYSTEM AND METHOD FOR PROVIDING TRANSACTIONAL SECURITY FOR AN END-USER DEVICE

(75) Inventor: Wee Tuck Teo, Singapore (SG)

(73) Assignee: Advanced Network Technology Laboratories Pte Ltd., Singapore (SG)

( * ) Notice: Subject to any disclaimer, the term of this patent is extended or adjusted under 35 U.S.C. 154(b) by 1079 days.

(21) Appl. No.: 11/694,476

(22) Filed: Mar. 30, 2007

(65) Prior Publication Data

US 2007/0234061 A1   Oct. 4, 2007

Related U.S. Application Data

(60) Provisional application No. 60/787,457, filed on Mar. 30, 2006, provisional application No. 60/814,828, filed on Jun. 19, 2006.

(51) Int. Cl.
*G06F 11/00* (2006.01)
*G06F 7/04* (2006.01)

(52) U.S. Cl.
USPC ...... 726/22; 726/26; 726/27; 726/5; 713/168; 713/193

(58) Field of Classification Search .................. 726/22
See application file for complete search history.

(56) References Cited

U.S. PATENT DOCUMENTS

| 5,983,348 | A | * | 11/1999 | Ji ........................... 726/13 |
|---|---|---|---|---|
| 6,178,244 | B1 | | 1/2001 | Takeda et al. |
| 6,732,279 | B2 | | 5/2004 | Hoffman |
| 6,772,345 | B1 | | 8/2004 | Shetty |
| 6,866,581 | B2 | | 3/2005 | Martinek et al. |
| 6,871,192 | B2 | | 3/2005 | Fontana et al. |
| 6,968,462 | B2 | | 11/2005 | Challener et al. |
| 7,080,407 | B1 | | 7/2006 | Zhao et al. |
| 7,086,086 | B2 | | 8/2006 | Ellis |
| 7,181,415 | B2 | | 2/2007 | Blaser et al. |
| 7,249,380 | B2 | | 7/2007 | Yang |
| 7,269,851 | B2 | | 9/2007 | Ackroyd |
| 7,325,193 | B2 | | 1/2008 | Edd et al. |
| 7,353,533 | B2 | | 4/2008 | Wright et al. |
| 7,418,504 | B2 | | 8/2008 | Larson et al. |
| 7,478,420 | B2 | | 1/2009 | Wright et al. |
| 7,516,476 | B1 | | 4/2009 | Kraemer et al. |

(Continued)

OTHER PUBLICATIONS

"Communication and Recovery Issues in Grid Environment", Wenjie et al., p. 82-86, Nov. 14-16, 2004, InfoSecu04.*

(Continued)

*Primary Examiner* — Taghi Arani
*Assistant Examiner* — Mohammad L Rahman
(74) *Attorney, Agent, or Firm* — Sheppard Mullin Richter & Hampton LLP

(57) ABSTRACT

A network system comprises a transaction network operative to provide a transaction with an end user; a trusted source of a security mechanism (e.g., a start/stop trigger module, an application lockout module, a network/file I/O control module, a trusted driver manager, a keystrokes generator driver, a keystrokes deletion hook, and/or a transaction network VPN manager) for at least partially protecting an end-user device from malicious code operative thereon that attempts to capture confidential data presented during the transaction, the security mechanism being maintained by a party other than the end user; and an agent for providing the security mechanism to the end-user device to protect the end-user device during the transaction.

40 Claims, 35 Drawing Sheets

U.S. PATENT DOCUMENTS

| | | | |
|---|---|---|---|
| 7,591,002 B2 | 9/2009 | Shelest et al. | |
| 7,685,179 B2 | 3/2010 | MacCormick | |
| 7,716,731 B2 | 5/2010 | Short et al. | |
| 7,827,611 B2* | 11/2010 | Kouznetsov et al. | 726/24 |
| 7,882,396 B2* | 2/2011 | Bolignano et al. | 714/37 |
| 2002/0004902 A1 | 1/2002 | Toh et al. | |
| 2002/0029342 A1* | 3/2002 | Keech | 713/184 |
| 2002/0166063 A1 | 11/2002 | Lachman et al. | |
| 2002/0184255 A1 | 12/2002 | Edd et al. | |
| 2003/0002072 A1 | 1/2003 | Berkema et al. | |
| 2003/0005044 A1 | 1/2003 | Miller et al. | |
| 2003/0037142 A1 | 2/2003 | Munger et al. | |
| 2003/0079143 A1 | 4/2003 | Mikel et al. | |
| 2003/0093400 A1 | 5/2003 | Santosuosso | |
| 2003/0120605 A1 | 6/2003 | Fontana et al. | |
| 2003/0131249 A1 | 7/2003 | Hoffman | |
| 2003/0154293 A1 | 8/2003 | Zmolek | |
| 2003/0159070 A1 | 8/2003 | Mayer et al. | |
| 2003/0177389 A1 | 9/2003 | Albert et al. | |
| 2004/0034794 A1 | 2/2004 | Mayer et al. | |
| 2004/0064335 A1 | 4/2004 | Yang | |
| 2004/0088570 A1 | 5/2004 | Roberts et al. | |
| 2004/0098485 A1 | 5/2004 | Larson et al. | |
| 2004/0123153 A1 | 6/2004 | Wright et al. | |
| 2004/0249974 A1 | 12/2004 | Alkhatib et al. | |
| 2005/0055578 A1 | 3/2005 | Wright et al. | |
| 2005/0066186 A1* | 3/2005 | Gentle et al. | 713/193 |
| 2005/0071282 A1* | 3/2005 | Lu et al. | 705/64 |
| 2005/0138395 A1 | 6/2005 | Benco et al. | |
| 2005/0149726 A1 | 7/2005 | Joshi et al. | |
| 2005/0172015 A1 | 8/2005 | Rana et al. | |
| 2005/0183143 A1 | 8/2005 | Anderholm et al. | |
| 2005/0216957 A1* | 9/2005 | Banzhof et al. | 726/25 |
| 2005/0229250 A1 | 10/2005 | Ring et al. | |
| 2006/0010252 A1* | 1/2006 | Miltonberger et al. | 709/245 |
| 2006/0031940 A1 | 2/2006 | Rozman et al. | |
| 2006/0036731 A1 | 2/2006 | Mossman et al. | |
| 2006/0064755 A1 | 3/2006 | Azadet et al. | |
| 2006/0090196 A1* | 4/2006 | van Bemmel et al. | 726/4 |
| 2006/0101128 A1 | 5/2006 | Waterson | |
| 2006/0101282 A1 | 5/2006 | Costea et al. | |
| 2006/0130141 A1 | 6/2006 | Kramer et al. | |
| 2006/0143706 A1* | 6/2006 | Kawasaki et al. | 726/19 |
| 2006/0185015 A1 | 8/2006 | Cheston et al. | |
| 2006/0206485 A1 | 9/2006 | Rubin et al. | |
| 2006/0206936 A1* | 9/2006 | Liang et al. | 726/22 |
| 2006/0224753 A1 | 10/2006 | Hama et al. | |
| 2006/0236391 A1 | 10/2006 | Kim et al. | |
| 2006/0259967 A1 | 11/2006 | Thomas et al. | |
| 2006/0265761 A1 | 11/2006 | Rochette et al. | |
| 2006/0282876 A1 | 12/2006 | Shelest et al. | |
| 2007/0011741 A1 | 1/2007 | Robert et al. | |
| 2007/0022287 A1 | 1/2007 | Beck et al. | |
| 2007/0036300 A1* | 2/2007 | Brown et al. | 379/88.22 |
| 2007/0055711 A1 | 3/2007 | Polyakov et al. | |
| 2007/0067833 A1* | 3/2007 | Colnot | 726/9 |
| 2007/0094496 A1 | 4/2007 | Burtscher | |
| 2007/0094723 A1 | 4/2007 | Short et al. | |
| 2007/0101435 A1 | 5/2007 | Konanka et al. | |
| 2007/0162975 A1 | 7/2007 | Overton et al. | |
| 2007/0182714 A1 | 8/2007 | Pemmaraju | |
| 2007/0199044 A1 | 8/2007 | Hughes | |
| 2007/0234061 A1 | 10/2007 | Teo | |
| 2007/0240212 A1 | 10/2007 | Matalytski | |
| 2007/0245343 A1 | 10/2007 | Shannon et al. | |
| 2007/0271189 A1 | 11/2007 | Morten et al. | |
| 2008/0016339 A1 | 1/2008 | Shukla | |
| 2008/0034419 A1 | 2/2008 | Mullick et al. | |
| 2008/0040800 A1 | 2/2008 | Park | |
| 2009/0037973 A1 | 2/2009 | Gustave et al. | |
| 2009/0037976 A1 | 2/2009 | Teo et al. | |
| 2009/0044266 A1 | 2/2009 | Sharp et al. | |
| 2009/0187763 A1 | 7/2009 | Freericks et al. | |
| 2009/0187991 A1 | 7/2009 | Freericks et al. | |

OTHER PUBLICATIONS

"Throttling Viruses: Restricting propagation to defeat malicious code", Matthew M Williamson, IEEE, 2002.*

International Search Report for International Application No. PCT/US07/07994 mailed Jan. 29, 2008.

Written Opinion for International Application No. PCT/US07/07994 mailed Jan. 29, 2008.

PCT International Search Report and Written Opinion dated Oct. 20, 2008, for International Application No. PCT/US2008/067031.

Greenborder Pro 2.9 Article—Reviews by PC Magazine (PCMAG.com), Reviewed on (Jun. 24, 2006) Found on www on Apr. 30, 2008 at http://www.pcmag.com/article2/0,2704,1980991,00.asp.

* cited by examiner

SYSTEM AND METHOD FOR PROVIDING TRANSACTIONAL SECURITY FOR AN END-USER DEVICE

PRIORITY CLAIM

This application claims benefit of and hereby incorporates by reference provisional patent application Ser. No. 60/787,457, entitled "Trusted Network Transaction," filed on Mar. 30, 2006, by inventor Wee Tuck Teo; and provisional patent application Ser. No. 60/814,828 entitled "End Point Remote Data Exchange Security," filed on Jun. 19, 2006, by inventor Wee Tuck Teo.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to network systems, and more particularly provides a system and method for providing transactional security to an end-user device.

BACKGROUND

Security is a key concern during online transactions. Commercial Internet transactions, e.g., Internet banking, credit card purchases, etc., are only as secure as the weakest link. Traditional security solutions focus on server-side infrastructure security, e.g., HTTPS web site, two-factor authentication, etc. While the server side has security expert management and maintenance, the end user's computers do not have such benefit.

Current online transaction risks increase due to poor end user security practices. The current solution to end user security tends to focus on end user education, e.g., training end users to recognize phishing attempts and ignore spoofed emails, and installing end-user security software to clean up and secure end-user devices from malicious code, e.g., viruses, spyware, adware, keyloggers, backdoors, Trojans, etc. Solving the end-user device vulnerabilities using the above approach is dependent on end-user efforts, e.g., regular installation of security software updates such as signature files, regular execution of scans, regular application of the security patches, etc.

Additionally, the generally open nature of the Internet makes shared Internet resources, e.g., DNS servers, intermediate routers, etc., susceptible to web site hijacking. Shared Internet resources are not managed by web site owners or end users, making securing these shared resources outside the control of the stakeholders.

A system and method that facilitates protection of an end-user device are needed.

SUMMARY

According to one embodiment, instead of ensuring that an end-user device is permanently secure, which requires ongoing security management, embodiments of the invention ensure that the end-user device is secure only during a transaction, e.g., an online transaction. This reduces end-user security management overhead. For example, an end-user device may be infected with keyloggers or remote backdoors during normal operation. However, according to embodiments of the invention, these threats need only be disabled during the transaction. According to another embodiment, instead of depending on an end user to manage the security software, software that enables a trusted network transaction (TNT) environment is managed and provided by a trusted source that provides the security software or security policy on demand. For example, the security software or security policy may be delivered/pushed from a transaction site, from a service provider site (e.g., the end user's Internet service provider, the transaction site's security provider, an independent service provider, or the like) onto the end-user device. According to yet another embodiment, the security software delivered/pushed onto an end-user device may remove dependencies on shared Internet resources. For example, the IP address of a destination web or VPN server may be provided directly to the end-user device to determine or force a new connection over the Internet with the destination web or VPN server. Yet another embodiment secures data exchange by ensuring that confidential data cannot be permanently captured by malicious software residing on an end-user device, or that confidential data captured cannot be sent or misdirected to untrusted remote sites. These and other TNT mechanisms (security engines, security profiles, and/or the like) can be deployed independently or in different combinations.

According to one embodiment, the present invention provides a network system comprising a transaction network operative to provide a transaction with an end user; a trusted source of a security mechanism for at lest partially protecting an end-user device from malicious code operative thereon that attempts to capture confidential data presented during the transaction, the security mechanism being maintained by a party other than the end user; and an agent for providing the security mechanism to (e.g., installing or configuring the security mechanism on) the end-user device so that the appropriate security mechanism for the expected transaction protects the end-user device during the transaction.

The transaction network may provide a banking site and/or a gaming site. The trusted source may reside on an ISP network, SAS (software-as-a-service) operator network or on the transaction network. The trusted source and the transaction network may be managed by the same entity. The security mechanism any include a security engine and/or a security profile. The security mechanism may include a start/stop trigger module for controlling when to initiate one or more aspects of the security mechanism and when to deactivate the one or more aspects of the security mechanism; an application lockout module for suspending at least one application not needed to effect the transaction; a file/network I/O control module for disabling at least one file or network operation during the transaction; a trusted driver module for determining whether a driver, e.g., a keyboard driver, on the end-user devices matches a known trusted driver; a keystrokes generator driver for generating additional keystrokes to a keystroke pattern generated by the end user; a keystrokes deletion hook for deleting the additional keystrokes generated by the keystrokes generator driver; and/or a VPN manager capable of establishing a directional or undirectional secure tunnel between the end-user device and the transaction network. The security mechanism may include an IP address to a server within the transaction network. The agent or another agent may be capable of removing the security mechanism upon completion of the transaction. The agent may include an install agent downloaded from the trusted source, an install agent downloaded from a third-party server, and/or a connection agent preloaded onto the end-user device.

According to another embodiment, the present invention provides a method comprising initiating the security mechanism for a secure transaction by an end user a request with a transaction network providing a transaction; receiving from a trusted source a security mechanism for at least partially protecting an end-user device from malicious code operative thereon that attempts to capture confidential data presented during the transaction, the security mechanism being maintained by a party other than the end user; activating the security mechanism; establishing a secure connection between an end-user device and the transaction network; and enabling the transaction.

The transaction network may provide a banking site and/or a gaming site. The trusted source may reside on an ISP network, SAS operator network or on the transaction network. The trusted source and the transaction network may be managed by the same entity. The security mechanism may include a security engine and/or a security profile. The security mechanism may include a start/stop trigger module for controlling when to initiate one or more aspects of the security mechanism and when to deactivate the one or more aspects of the security mechanism; an application lockout module for suspending at least one application not needed to effect the transaction; a file/network I/O control module for disabling at least one file or network operation during the transaction; a trusted driver module for determining whether a driver, e.g., a keyboard driver, on the end-user device matches a known trusted driver; a keystrokes generator driver for generating additional keystrokes to a keystroke pattern generated by the end user; a keystrokes deletion hook for deleting the additional keystrokes generated by the keystrokes generator driver; and/or a VPN manager capable of establishing a secure tunnel between the end-user device and the transaction network. The security mechanism may include an IP address to a server within the transaction network. The method may further comprise removing the security mechanism upon completion of the transaction.

DETAILED DESCRIPTION

The following description is provided to enable any person skilled in the art to make and use the invention and is provided in the context of a particular application. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

According to one embodiment, instead of ensuring that an end-user device is permanently secure, which requires ongoing security management, embodiments of the invention only ensure that the end-user device is secure during a data sensitive transaction. This reduces end-user security management overhead. For example, an end-user device may be infected with keyloggers or remote backdoors during normal operation. However, according to embodiments of the invention, these threats need only be disabled during the transaction. According to another embodiment, instead of depending on an end user to manage the security software, software that enables a trusted network transaction (TNT) environment is managed and provided by a trusted source that provides the security software on demand. For example, the security software may be delivered/pushed from an online transaction site, from a service provider site (e.g., the end user's Internet service provider, the transaction site's security provider, an independent service provider, or the like) onto the end-user device. According to yet another embodiment, the security software delivered/pushed onto an end-user device may remove dependencies on shared Internet resources. For example, the IP address of a destination VPN server may be provided directly to the end-user device to force a new connection over the Internet with the destination VPN server. Yet another embodiment secures data exchange by ensuring that confidential data cannot be permanently captured by malicious software residing on an end-user device, or that confidential data captured cannot be sent or misdirected to untrusted remote sites. These and other TNT mechanisms (security engines, security profiles, and/or the like) can be deployed independently or in different combinations. It will be appreciated that the transaction is not necessarily an online transaction; it could be a local transaction, e.g. opening an encrypted local file.

Figure 1:
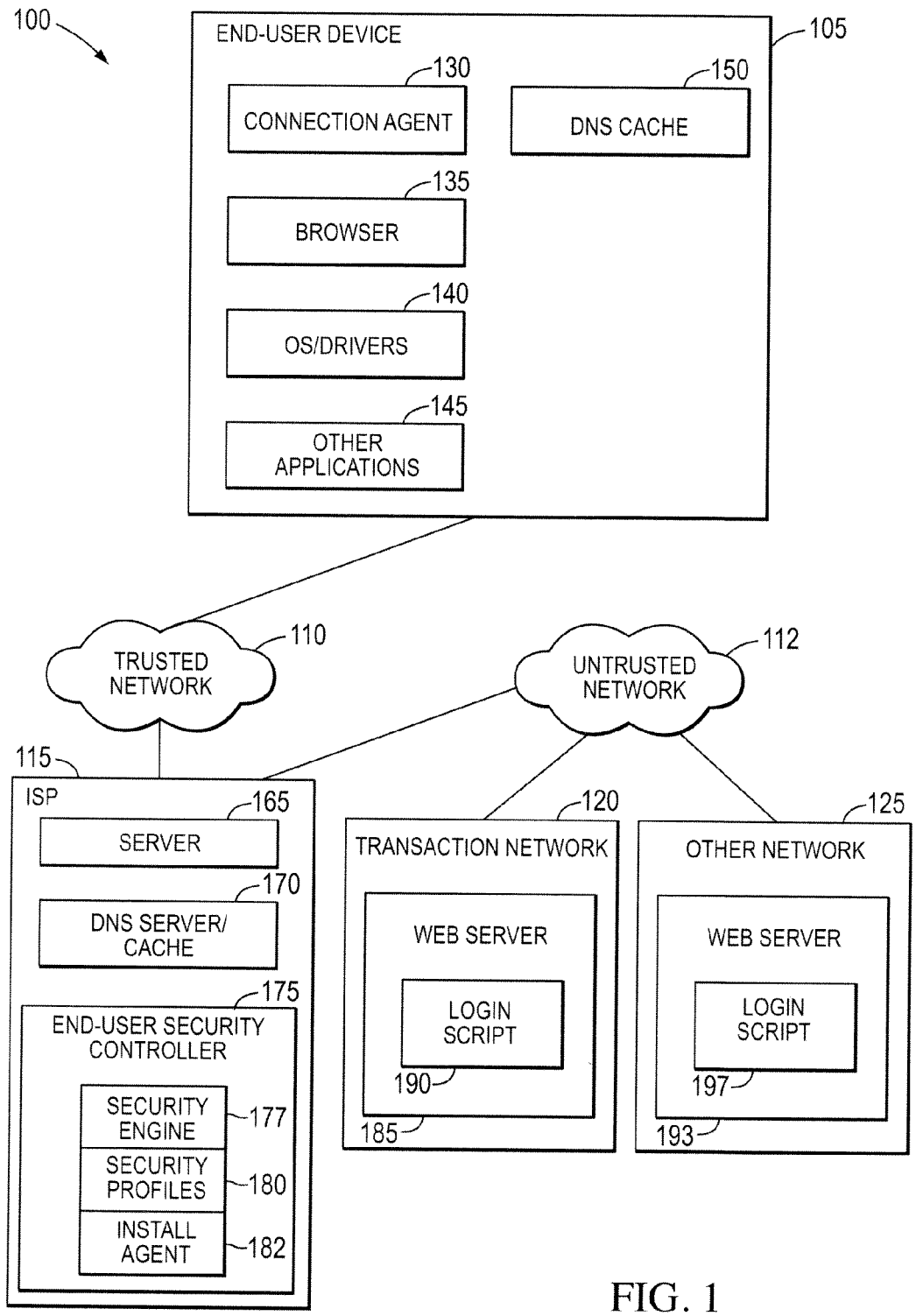
FIG. 1 is a block diagram of a network system operative to secure an end-user device, in accordance with an embodiment of the present invention.

FIG. 1 is a block diagram of a network system 100 operative to secure an end-user device 105, in accordance with an embodiment of the present invention. The network system 100 includes an end-user device 105 coupled via a trusted network 110 to an Internet service provider (ISP) network 115, which is coupled via an untrusted network 112 to a transaction network (e.g., server, network of servers, etc.) 120 (e.g., bankofamerica.com, amazon.com, ebay.com, etc.) and to another network 125.

The end-user device 105 includes a browser 135 (e.g., Microsoft Internet Explorer or Netscape Navigator), an operating system (e.g., Microsoft Vista or Apple Mac OS X) and device drivers 140, and other applications 145. The end-user device 105 also includes a connection agent 130 capable of communicating with a trusted source of a security mechanism (e.g., security engine and/or security profiles) that secures the end-user device 105 during an online transaction. The end-user device 105 may also maintain a local DNS cache 150.

The ISP network 120 includes a server 165, a DNS server/cache 170, and an end-user security controller 175. In another embodiment, components of the end-user security controller 175 may be located elsewhere (e.g., the security engine can be on the trusted network and the security policy can be on the transaction network), such as on the transaction network 120 or on another trusted source. The end-user security controller 175 includes a security engine 177 and security profiles 180 for download to the end-user device 105. The security engine 177 contains software that sets up a secure data exchange between the end-user device 105 and a remote network application running on a trusted device in a trusted network, e.g., a trusted server on the transaction network 120. The security profiles 177 contain the rules, definitions and/or identification information for the security engine 180 to block unexpected behaviors due to, e.g., viruses, spyware, adware, Trojans, etc. It will be appreciated that the ISP network 120 may support multiple transaction networks 120, and may include multiple security controllers 175 (each dedicated to a particular transaction network 120). Alternatively, the ISP network 120 may have a single security controller 175, and may customize the security engine 177 and/or security profiles 180 on the fly for the particular transaction network 120.

It will be appreciated that the security engine 177 and/or security profiles 180 may be updated on a regular basis by a security manager. Then, as needed, possibly on an irregular basis as the end user connects to the ISP network 120 and/or to the transaction network 120, the end-user security controller 175 downloads the security engine 177 and/or security profiles 180 to the end-user device 105. In one embodiment, the security engine 177 and/or security profiles 180 are maintained only during the transaction session, and are removed upon completion of the transaction. In another embodiment, the security engine 177 and/or security profiles are not removed, and are updated before each new transaction begins. In another embodiment, the security engine 177 and/or security profiles 180 are operative between transactions, and serve to protect the end-user device 105 in the current state until a subsequent transaction request deploys an update. Additional details of the security engine 177 are shown and described with reference to FIG. 2.

The transaction network 120 includes at least one web server 185, which includes a login script 190. The login script 190 may request confidential information from the end user. After download, the security engine 177 and security profiles 180 protect the confidential data being provided by the end user from unintended capture, undesired transfer to third parties, etc.

The other network 125 includes at least one web server 193, which includes a login script 197. In one embodiment, the other network 125 may provide a malicious site developed to mimic the site provided by transaction network 120. In such embodiment, the security engine 177 and security profiles 180 protect the end user from being misdirected to the other network 125, e.g., via DNS poisoning, etc.

In one embodiment, the connection agent 130 is securely delivered and pre-installed on the end-user device 105. Whenever secure data exchange is required, the connection agent 130 downloads a trusted copy of the security engine 177 and/or security profiles 180. The connection agent 130 can be implemented as a standalone executable application, as a plug-in to the browser 135, as a part of the operating system 140, etc. In one embodiment, it is assumed that the connection agent 130 is delivered, pre-installed and executed on the end-user device 105 without modification. If the connection agent 130 does not come from a trusted source, then secure data exchange may be compromised.

In one embodiment, the connection agent 130 uses a pre-configured and unchangeable network address to contact a secure network address resolution service to obtain the IP address of the trusted source providing the security engine 177 and/or security profiles 180. For example, an IP address of a trusted DNS security extensions (DNSSEC) server may be embedded in the connection agent 130. The connection agent 130 may use this IP address to connect to the DNSSEC server to resolve the domain name of the trusted source to an IP address. Using the network address of the trusted source, a secure data exchange may be established to provide a secure connection to the trusted source, preventing network traffic from the end-user device 105 from being misdirected to untrusted sources and guarding against other forms of network intrusion and attacks. For example, in a TCP/IP network, the connection agent 130 may use the resolved IP address to connect to the trusted source, e.g., via a secure tunnel. This connection technique ensures that the IP address is accurate (e.g., not poisoned by a DNS attack), and assures that the end-user device 105 connects to the intended trusted source. Further, communication protocols employed in the secure network address resolution service ensures that communication to and from the end-user device 105 is authenticated, authoritative and accurate.

With a secure data exchange established, the end-user device 105 can download the security engine 177 and/or security profiles 180, e.g., using protocols like HTTP or FTP. The secure tunnel established by the connection agent 130 ensures that data traffic between the end-user device 105 and the trusted source is secure and cannot be compromised, even when insecure protocols like HTTP and FTP are used.

After delivery of the security engine 177 and/or security profiles 180, the end-user device 105 executes the security engine 177. The security engine 177 effectively secures the end-user device 105, e.g., allows the end-user device 105 to communicate only with trusted sites, prevents other applications 145 running on the end-user device 105 from capturing or sending information, especially to untrusted sites, etc. The user can then access and interact with the transaction network 120 in confidence.

In another embodiment, the connection agent 130 and security engine 177 are pre-loaded onto the end-user device 105. Then, using the techniques described above to obtain the security engine 177 and/or security profiles 180, the connection agent 130 and security engine 177 may obtain current security profiles 180 to configure and/or operate with the pre-loaded security engine 177.

It will be appreciated that the connection agent 130 may cooperate with the end-user security controller 175 to establish a preliminary VPN tunnel (e.g., Microsoft PPTP or L2TP/IPSEC) before obtaining the security engine 177 and/or security profiles 180. This preliminary VPN tunnel ensures that the security engine 177 and/or security profiles 180 are not modified or replaced in transit. In one embodiment, the preliminary VPN tunnel is dynamically established using IP (instead of DNS) as the destination address. This bypasses the dependency on the Internet-shared DNS service.

It will be further appreciated that security engine 177 may establish a transaction network VPN tunnel (e.g., Microsoft PPTP or L2TP/IPSEC) with the transaction network 120. This VPN tunnel ensures that confidential data communicated with the transaction network 120 is not captured. In one embodiment, the VPN tunnel is dynamically established using IP (instead of DNS) as the destination address. The IP address can be securely updated immediately (as compared to using DNS) because the IP address can be directly set in the security engine 177 and/or security profiles 180 (which is directly managed by the trusted party). This bypasses the dependency on the Internet-shared DNS service. In certain embodiments, the preliminary VPN tunnel may connect with the transaction network 120. Accordingly, in such embodiments, the security engine 177 need not establish a different tunnel.

Figure 2:
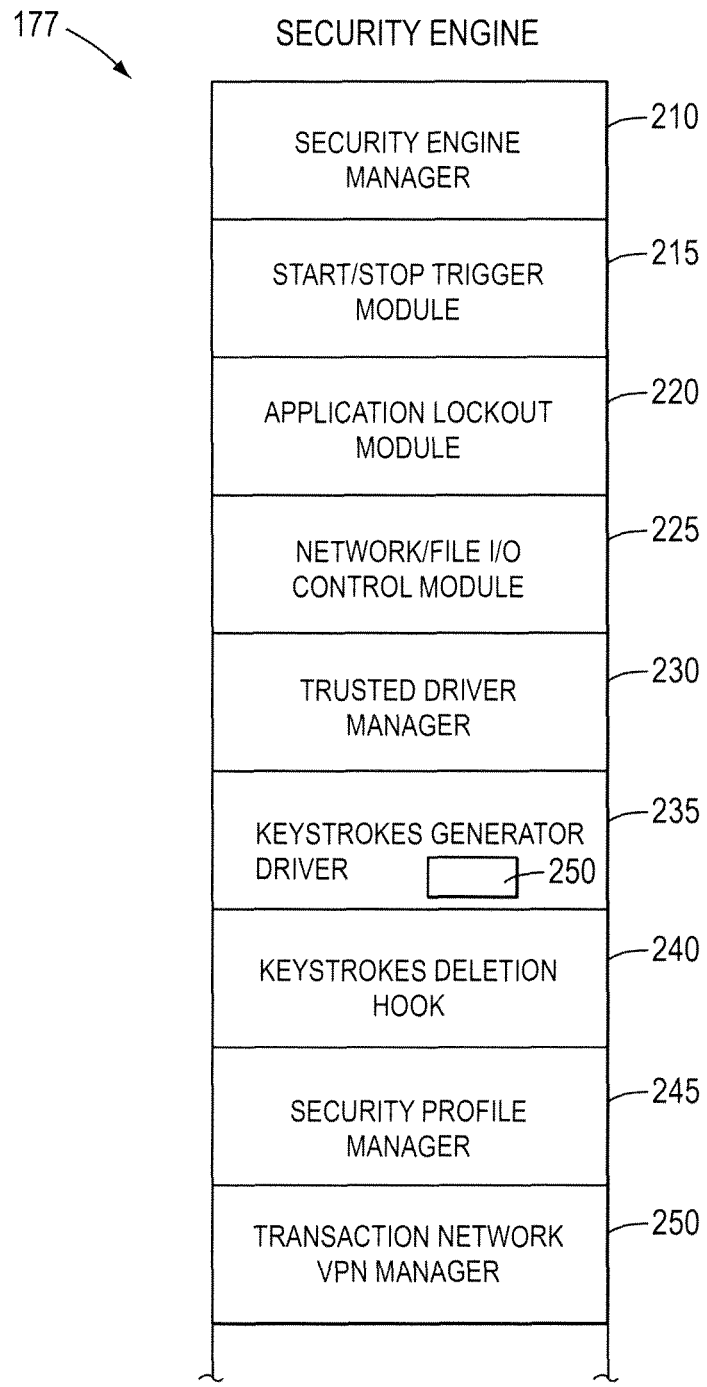
FIG. 2 is a block diagram illustrating details of the security engine of FIG. 1, in accordance with an embodiment of the present invention.

FIG. 2 is a block diagram illustrating details of the security engine 177, in accordance with an embodiment of the present invention. The security engine 177 includes a security manager 210, a start/stop trigger module 215, an application lockout module 220, a network/file I/O control module 225, a trusted driver manager 230, a keystrokes generator driver 235, a keystrokes deletion hook 240, a security profile manager 245, and a transaction network VPN manager 250.

The security manager 210 includes hardware, software and/or firmware to manage the execution of and interaction between the various components of the security engine 177. The start/stop trigger module 215 includes hardware, software and/or firmware to determine where and when data protection is needed. The application lockout module 220 includes hardware, software and/or firmware to effectively suspend other applications not needed during the online transaction (e.g., Authentium Trusted Security Extensions, SecureWave Sanctuary, and/or the like). The network/file I/O control module 225 includes hardware, software and/or firmware to prevent network and/or file I/O by other applications, e.g., by other applications that cannot be suspended. The trusted driver manager 230 includes hardware, software and/or firmware to determine whether device drivers, e.g., the keyboard input driver, on the end-user device 105 can be trusted. The keystrokes generator driver 235 includes hardware, software and/or firmware to generate additional keystrokes and/or replace keystrokes generated by the keyboard input driver 140, e.g., to input fake keystrokes in a keyboard input pattern. The keystrokes deletion hook 240 includes hardware, software and/or firmware to remove the additional keystrokes and/or replace the original keystrokes generated by the keyboard input driver 140, e.g., to regenerate the original keyboard input pattern modified by the keystrokes generator driver 235. The security profile manager 245 includes hardware, software and/or firmware to replace and/or update the security profiles 180. The transaction network VPN manager 250 includes hardware, software and/or firmware to establish a VPN tunnel with the transaction network 120.

It will be appreciated that one method of security leaks of confidential data (e.g., userid, password, credit card number, visual login screen, etc.) require the data to be locally captured and network transmitted. Thus, in some embodiments, instead of focusing on updating traditional anti-virus/anti-spyware with the latest security protection, the application lockout module 220 treats all applications not explicitly needed to use the transaction network 120 as a security threat and disables them for the duration of the online transaction. For example, during the online transaction, the application lockout module 220 allows only the browser 135 and browser-helper applications (e.g., PDF reader) to continue normal execution, while effectively suspending all other applications 145 (regardless of whether they are benign or malevolent). Optionally, the application lockout module 220 could permanently terminate (instead of temporarily suspend) well-known spyware or Trojans.

Depending on the OS and applications control component features, it is possible for the application lockout module 220 in a first stage to suspend unrequired applications 145 by placing them into background mode, by preventing OS event (e.g., Microsoft windows event messages) from being received by these applications 145, by intercepting all keyboard and mouse operations to these applications 145, and/or the like. Further, in a second stage, the application lockout module 220 may stop new applications or processes from being executed, e.g., to prevent changes to the security engine 177 and/or security profiles 180 during the transaction. Thus, unrequired or infected applications that bypass the first stage of protection cannot create another process to capture confidential information or disable the security software.

In some embodiments, it might not be technically possible for the application lockout module 220 to suspend all unrequired applications 145 and OS processes (e.g., the OS timer), as such might create unintended side effects (e.g., application crashes). When an application 145 cannot be suspended, the network/file I/O control module 225 may provide a second level of global security. The network/file I/O control module 225 effectively prevents information leakage by these unrequired applications 145. Since unrequired applications 145 need to store and/or transmit the captured information, preventing file I/O operations and/or network I/O transmissions can stop permanent storage and/or transfer of the data. Thus, even if the information is captured by the malicious code, no one can obtain the compromised data. In the extreme case, if the leaked information is cached in memory, rebooting the OS would clear the data. The network/file I/O control module 225 can deny write attempts to all files/directories or the OS registry not required by the browser 135. Using a VPN tunnel may prevent the confidential data from being sent to the Internet by spyware, Trojans, or the like.

Embodiments of the invention attempt to enforce protection and/or application/network lockout on demand during a secured data exchange session with less user disruption. Traditional end-point protection and/or lockout solutions, e.g., SecureWave, Bit9, etc., apply full protection or lockout of the end-user device 105 to ensure that only valid or authorized applications are allowed to run. However, this approach is intrusive and disruptive to the end user, who loses the capability to perform normal computing tasks. Embodiments of the invention achieve protection and/or lockout by determining interaction points where and when important sensitive information is being sent to and/or received by the user; by activating end-point protection and/or lockout mechanisms only during these sensitive interaction points; and by de-activating protection and/or lockout outside these interaction points where and when the user is doing things that do not compromise security.

The start/stop trigger module 215 determines the interaction points during a user's data exchange session where and when sensitive data needs protection. The start/stop trigger module 215 generates a Sensitive_Start flag when sensitive information is present, e.g., when sensitive information is about to be sent, sensitive data is about to be received, sensitive data is about to be displayed, combinations of these points, etc. The start/stop trigger module 215 generates a Sensitive_Stop flag when no sensitive information is present, e.g., when no sensitive data is being sent, received, displayed, etc.

These flags activate or de-activate end-point protection and/or lockout mechanisms by the application lockout module 220 and/or network/file I/O control module 225 in a more granular manner, which is less intrusive to the end user. For example, assuming the security software is deployed to protect a payment transaction performed on Paypal, the start/stop trigger module 215 could determine when the user's keyboard focus is on the Paypal browser instance, e.g., the user is likely to be sending sensitive login credentials or credit card information to complete the payment, or when any part of the Paypal browser is visible, e.g., personal Paypal user information or transaction data may be displayed. Full security protection may be enforced when this event is detected.

If the user opens a word documents for editing, the start/stop trigger module 215 may issue a Sensitive_Stop flag, e.g., when it determines that the Paypal browser 135 that it is protecting no longer has keyboard focus (such that no sensitive information meant for Paypal can be captured by keyloggers), or when it determines that the Paypal browser 135 no longer has window focus and no visible area is shown (such that no sensitive personal information related to Paypal can be captured through screen capturing software). Thus, security mechanisms can be turned off when this even occurs.

The timing for the start/stop trigger module 215 to issue Sensitive_Start and Sensitive_Stop flags can be further customized and refined to fit various security levels for various applications. For example, it may be deemed important to protect the user's login credentials only for an online gaming application and not the gaming screen. Therefore, the Sensitive_Start and Sensitive_Stop flag requirement can be refined to detect only keyboard focus acquired or lost in the gaming application, and not to require detection of window focus.

In certain embodiments, the start/stop trigger module 215 may listen for a window-focus loss event of the protected application and may minimize the protected application's window. Then, the start/stop trigger module 215 may trigger the Sensitive_Stop event, since it is certain that the protected area is not visible when minimized.

As an enhancement to achieve transparent and seamless end-point protection, current end-point protection and/or lockout mechanisms on the end-user device 105 may need to be modified to support fast and on-demand activation and de-activation. Working in collaboration with the start/stop trigger module 215, a fast-switching engine may provide seamless transition when switching between a protected application and a non-protected application. End-point protection may be turned on quickly when the user is working on the protected application and may be turned off quickly when the user switches to a non-protected application. To achieve fast switching, traditional techniques like network tunnel pre-establishment or keep-alive and application pre-loading of the end-point protection process can be used. In one embodiment, the pre-establishment and pre-loading can be done when the OS starts up and/or when the end-point protection mechanism is first activated. The corresponding cleanup can be done when the last protected application is closed and/or when the OS shutdown.

An example process incorporating start/stop triggers includes:

(1) The end user boots up computer and launches messaging software like MSN and skype.

(2) The end user opens a browser 135 session, and activates the connection agent 130 to access his Internet Banking site (e.g., Citibank), which has implemented TNT security software, to transfer funds to his friend.

(3) The connection agent 130 establishes a secure data exchange to the Citibank site.

(4) An install agent 182, e.g., Citibank ActiveX object, is downloaded and loaded into memory.

(5) The install agent 182 downloads and installs the security engine 177 and/or security profiles 180.

(6) The start/stop trigger module 215 determines that the Citibank Webpage is in focus, issues a Sensitive_Start flag, and activates the security engine 177. All traffic goes through the compulsory non-hijack tunnel and other applications are blocked. The MSN and skype connections break during this stage.

(7) The end user logs securely into the Citibank Internet banking site and his login credentials are protected by the security engine 177.

(8) Before completing the fund transfer transaction, the end user switches to his MSN application to chat with his friend to confirm the amount of transfer.

(9) Since focus is lost from the Citibank Internet banking site, the start/stop trigger module 215 detects the window focus loss event, minimizes the Citibank browser 135 session, issues the Sensitive_Stop flag, and disables the security engine 177. Thus, traffic is allowed to go through the original route and not the compulsory tunnel. Further, application blocking is turned off.

(10) MSN detects network connectivity and reconnects, allowing the end user to chat with his friend.

(11) The end user launches his Excel application and updates his daily expenses spreadsheet.

(12) The end user switches back to the Citibank website. The start/stop trigger module 215 notes the Sensitive_Start flag and re-enables the security engine 177. The MSN and skype connections break again.

(13) The end user completes the fund-transfer transaction and closes the Citibank browser 135 session.

(14) The security engine 177 and/or security profiles 180 are unloaded from memory.

It will be appreciated that traditional keylogger protection mechanisms employ anti-virus detection logic to find and remove resident keyloggers on the end-user device. Unlike computer virus or worms, keyloggers on their own do not attempt to propagate, making keyloggers hard to detect or block using heuristics. Generally, keyloggers hook onto processes available in the end-user device operating system to capture but not modify keystrokes entered by the end user using any keyboard input device or software (e.g., visual keyboard). In certain embodiments, as an alternative approach, the trusted driver manager 230 allows resident intended or unintended keyloggers to continue execution, but renders the keylogging operation ineffective when necessary.

In certain embodiments, the keyboard input device driver 140 must be trusted. The trusted driver manager 230 validates the current driver 140 by comparing a secure ID, a secure hash, and/or the like against a list of trusted and/or untrusted keyboard input secure drivers, IDs, hashes, and/or the like. When the keyboard input device driver 140 is unknown, i.e., not in the list of trusted and/or untrusted drivers, the trusted driver manager 230 can temporarily or permanently replace the unknown driver 140 with a trusted driver, possibly only for the duration of the data exchange session.

In certain embodiments, resident keyloggers may capture keystrokes from any available OSI level beginning from keyboard input device driver 140 to the user space application 145. Since keyloggers invisibly and passively capture keystrokes, it is reasonable to assume that the keyloggers (unlike the end user, end user application or remote application) cannot differentiate valid or invalid keystrokes from keyboard input devices. Accordingly, the keystrokes generator driver 235 an modify the sequence of end user supplied keystrokes. The modified pattern can be application sensitive, such that it is only generated when specific applications that require keylogger protection are active.

The keyboard data exchange end-point protection may follow one of various implementation models, e.g., a standalone keystrokes generator driver 235 with application monitoring hook 250 (standalone mode); or a dual keystrokes generator driver 235 and keystrokes deletion hook 240 with optional application monitoring hook 250 (producer consumer mode).

In standalone mode, the keystrokes generator driver 235 generates fake keystrokes when the keystrokes input by the end user need to be protected. For example, the keystrokes generator driver 235 can generate invalid keystrokes such as non-existent application shortcut menu options that will be silently dropped by the browser 135 when confidential data is input by the end user. The application monitoring hook 250, which in one embodiment may be part of the start/stop trigger module 215, determines when the keystrokes input by the end user need to be protected based on the current application status receiving the keystrokes. A non-exhaustive list of relevant application status information includes the application process name, current active text input frame (e.g., application configuration input or user specific data input), valid and invalid application keystrokes, etc. In one embodiment, the keystrokes generator driver 235 determines the keystrokes to generate. In another embodiment, the application monitoring hook 250 analyzes the application status and determine the keystrokes for the keystrokes generator driver 235 to generate.

In producer consumer mode, the keystrokes generator driver 235 and keystrokes deletion hook 240 control keystroke generation and deletion. In one embodiment, the keystrokes generator driver 235 may embed identification of the fake keystrokes within the keystrokes data flow (inband mode), may be managed by an external controller such as the application monitoring hook 250 (outband mode), or may employ a combination of inband and outband controls. The keystrokes deletion hook 140 can be implemented as an OS hook or application-specific plug-in installed at the last possible level of the keyboard input processing flow shown in FIG. 6. The execution point of the keystrokes deletion hook 240 is operatively contradictory to keyloggers implementation requirement, which attempts to be at the earliest input processing flow closest to avoid being circumvented. The keystrokes deletion hook 240 deletes fake keystrokes generated by the keystrokes generator driver 235, before the fake keystrokes are processed by the protected end-user applications.

For keyloggers requiring local or remote keystrokes disk storage with limited keystrokes memory buffer, I/O blocking logic (possibly combined with either or both of the above mentioned approaches) can cause such keyloggers to lose keystrokes data or malfunction. One example process includes:

(1) Start I/O blocking (2) Before the end user inputs confidential data, the keystrokes generator driver 235 generates fake keystrokes to fill up keyloggers limited memory buffer or causes the keyloggers to lose data.

(3) After the end inputs confidential data, the keystrokes generator driver 235 generates fake keystrokes to overwrite any keyloggers limited memory buffer or causes the keyloggers to lose data.

(4) Stop I/O blocking.

It will be appreciated that VPN tunneling is a well-established concept used to authenticate access to a remote network with private resources, to provision access to the remote network with the private resources, and to secure the confidentiality and integrity of the private data exchanged between the end-user device and the remote network. VPN tunneling can also indirectly prevent access to other public resources originally accessible to the end-user device. Further, VPN tunneling may be used for server authentication (authenticating the transaction network 120) and for client authentication (authenticating the end-user device 105). VPN tunnel encryption indirectly prevents tunnel hijacking, since encrypted data cannot be spoofed. VPN tunneling may be used to allow access to a predetermined set of resources without requiring network revamp. This predetermined set of resources can be a combination of public resources (e.g., resources the end-user device 105 can remotely access before the VPN tunnel is established) and private resources (resourced that the end-user device 105 can only access after the VPN tunnel is established).

For certain embodiments of the invention, a VPN may be valued to authenticate the remote network, to provision access to the authenticated remote network resources, to prevent access to all other remote resources outside the authenticated remote network, and to ensure the integrity of the data exchanged between the two end-points (the end-user device and the authenticated remote network).

To authenticate the remote network, the connection agent 130 and/or transaction network VPN manager 250 may authenticate the remote network (e.g., the transaction network 120) using any predefined direct or indirect trust relationship. Authentication can be achieved indirectly using existing public key infrastructure (PKI) mechanisms or directly using a predefined secret key.

To ensure the integrity of the data exchanged, after the authentication phase, the connection agent 130 and/or transaction network VPN manager 250 may employ a key exchange process with the authentication router, e.g., using Diffie-Hellman key exchange. This key exchange process may be integrated with the authentication process as a single phase, e.g. Perfect Forward Secrecy. The transaction network 120 may use the ephemeral key negotiated by the key exchange process to ensure data integrity between the two end-points, to verify data integrity received from the end-user device 105, and/or to generate message authentication code for the data sent from the remote network to the end-user device 105, e.g. Message-Digest algorithm 5. The same reverse logic applies to the connection agent 130 and/or transaction network VPN manager 250. The message authentication code can be inband (part of the data exchange, e.g. IPSEC Authentication Header) or outband (e.g., using a different communication channel).

Tunneling, authentication and data integrity verification can be decoupled in implementation, i.e., they may be performed by independent entities. For example, the VPN tunnel can be established between the end-user device 105 and a hardware-based dedicated tunneling router. Authentication may be performed between the end-user device 105 and a server behind the tunneling router. Since in one embodiment tunneling involves only encapsulation and decapsulation, a dedicated tunneling router can perform it efficiently. If traffic integrity checking is performed inband of the tunnel, then, based on the source and the destination IP address of the traffic with message authentication code, the tunneling router could route or load balance the traffic to different authentication servers to perform data integrity checking.

To prevent access to remote resources, the connection agent 130 and/or VPN manager 250 may establish a compulsory tunnel from the end-user device 105 to the transaction network 120. Conversely, traffic from the transaction network 120 to the end-user device 105 need not necessarily be tunneled. To provide access to authenticated resources and to prevent access to all other remote resources, a bi-directional or unidirectional tunnel may be used, a virtual IP may be allocated to the end-user device 105, and/or ingress or egress filtering may be used.

Figure 7:
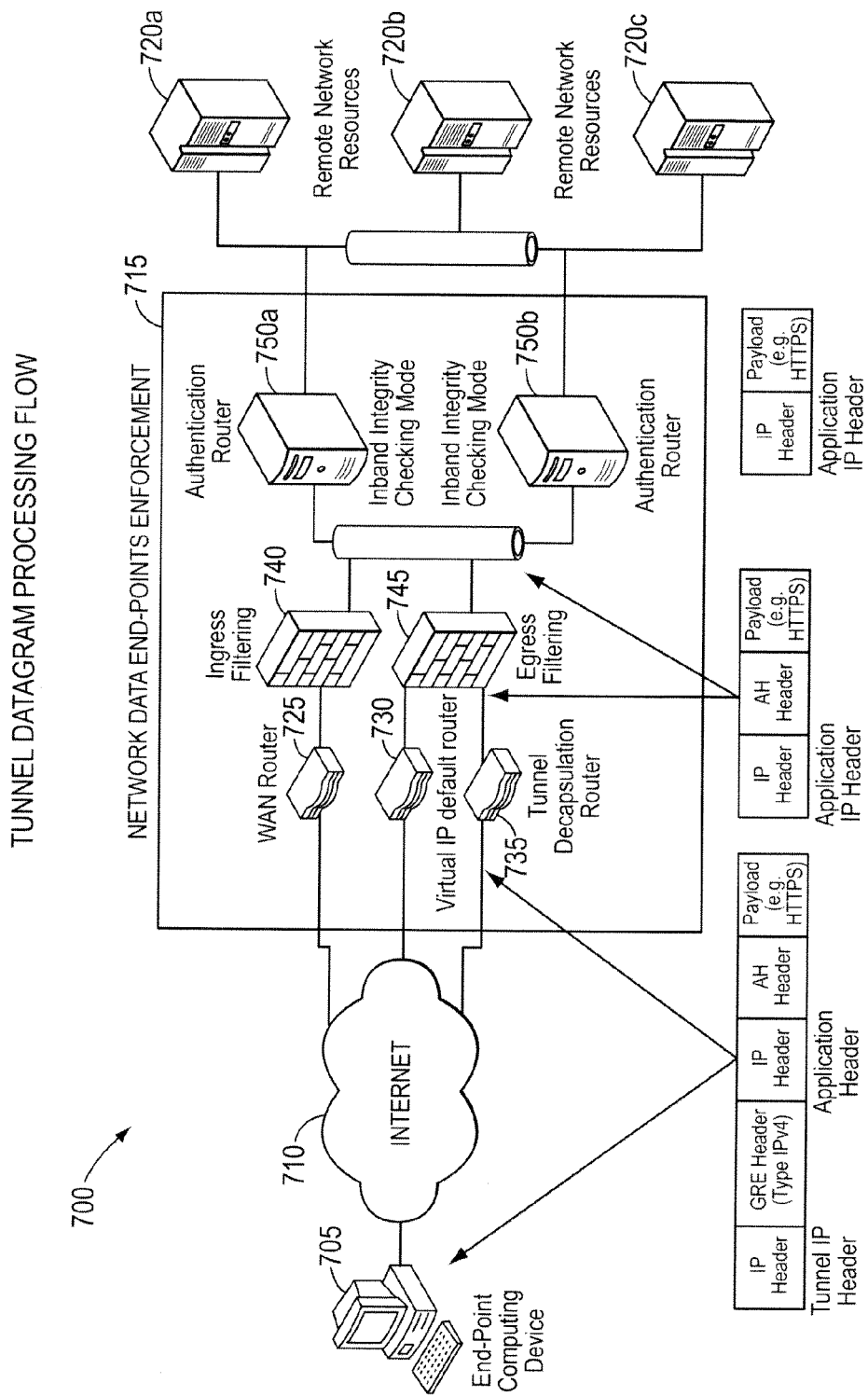
FIG. 7 is a block diagram illustrating a network system operative to effect tunnel datagram processing, in accordance with an embodiment of the present invention.

If a virtual IP is allocated to each end-user device 105 to access the remote network resources, all end-user devices 105 can be grouped under a common pool of IP addresses. As illustrated in FIG. 7, ingress filtering of these virtual IP addresses can be used to prevent data from the end-user devices 105 from being routed out of the authenticated remote network. Ingress filtering may not be possible if a uniquely identifiable virtual IP address pool is not allocated. In the case where ingress filtering is not possible, egress filtering can be done after the tunnel decapsulation router to ensure that only resources within the authenticated network are accessible.

There may be one or more default routers for the pool of virtual IP addresses. All data sent to these virtual IP address may be routed to these default routers. Bi-directional tunneling may be used if a virtual IP address is allocated, because the virtual IP address is only routable within the remote network. An exception may be employed when the virtual IP address used is a publicly routable IP address belonging to the end-user device 105. When bi-directional tunneling is employed, the virtual IP addresses default routers can encapsulate the data from the remote network back to the end-user device 105. Unlike the tunnel decapsulation router that is stateless, the default routers can maintain the tunnel state information. The tunnel state information may include the WAN IP to virtual IP association of the end-user device 105, to encapsulate and tunnel data back to the end-user device 105. The expiry of the tunnel state information may be effected via keep-alive messages sent from the connection agent 130 directly or indirectly to the default router(s).

In one embodiment, tunneling protocols can reuse the IP address of the end-user device 105 for both the tunnel IP header (traffic between the end-user device 105 and the decapsulation router) and the application IP header (traffic between the end-user device 105 and the remote network resources). If the tunneling protocol can reuse the IP address of the end-user device 105 for both tunneling and application communication, virtual IP provisioning by the remote network may be unnecessary. If computing device IP address reuse is not automatic, the remote network may use the virtual IP provisioning mechanism to decide if a localized virtual IP may be used for application communication or allocate the computing device IP address as the virtual IP.

The remote network virtual IP provisioning system may determine if the end-user device 105 is behind a Network Address Translation (NAT) or Network Address and Port Translation (NAPT) router, to determine what application communication IP address and tunneling protocol to use. By reusing the IP address of the end-user device 105 instead of a localized virtual IP for the tunnel IP header, bi-directional tunneling can be avoided. The application traffic from the remote network resources may be sent directly to the end-user device 105. Thus, virtual IP default router(s) to encapsulate the return traffic may be necessary.

If the end-user device is behind a NAT or NAPT router, a unidirectional transport level tunneling protocol that is NAT and NAPT friendly may be used. Instead of having both a tunnel IP header and an application IP header, there may be only one IP header. The unidirectional transport level tunneling protocol may be intended for application traffic from the end-user device 105 to the remote network decapsulation router.

An example tunneling encapsulation procedure is provided as follows:

(1) The end-user device 105 generates application data and application IP header (i.e., an application IP datagram).
(2) The application IP datagram is sent to the tunneling driver.
(3) The tunneling driver inserts the original destination IP address in the transport header field (e.g., the TCP option field) or between the transport header and the application payload.
(4) The tunneling driver replaces the destination IP address with the IP address of the remote network decapsulation router.
(5) The tunneling driver may set the IP header type-of-service field to indicate the datagram is encapsulated.
(6) The tunneling driver adjusts the IP header total length and re-computes the IP header checksum.
(7) The encapsulated IP datagram is transmitted.

An example tunneling decapsulation procedure is as follows:

(1) The decapsulation router checks if the datagram is encapsulated, e.g., checks the IP header type-of-service field or TCP option field.
(2) If the datagram is encapsulated, the decapsulation router replaces the destination IP address with the original embedded application destination IP address.
(3) The embedded application destination IP address may or may not be removed by the decapsulation router.
(4) The decapsulation router re-computes the IP header checksum and adjusts the IP header total length if necessary.
(5) The decapsulated IP datagram is transmitted.

Embodiments of the tunneling protocol achieve functionality similar to TCP or UDP port forwarding, without the need for the decapsulation router to keep state or port to IP address mapping configuration information. Such information is encapsulated in the tunneled datagram.

If the remote network provisioning system can verify that the traffic from the end-user device 105 will not be NATed, standard tunneling protocols (e.g., GRE, IP-in-IP, etc.) can be used. The IP of the end-user device 105 can be reused for both the tunnel IP header and application IP header using standard tunneling protocol. The tunneled traffic can be decapsulated by standard routers and the remote network resources can directly reply to the end-user device 105 without bi-directional tunneling.

Embodiments of the invention enable application-specific encryption (e.g., HTTPS) to be used in conjunction with the tunneling mechanism described herein to ensure privacy of confidential data. That is, there can be a combination of encrypted and unencrypted data exchange through the tunnel. This reduces encryption and decryption overhead to only confidential data, instead of maintaining encryption and decryption overhead for all data in a VPN architecture.

Figure 3:
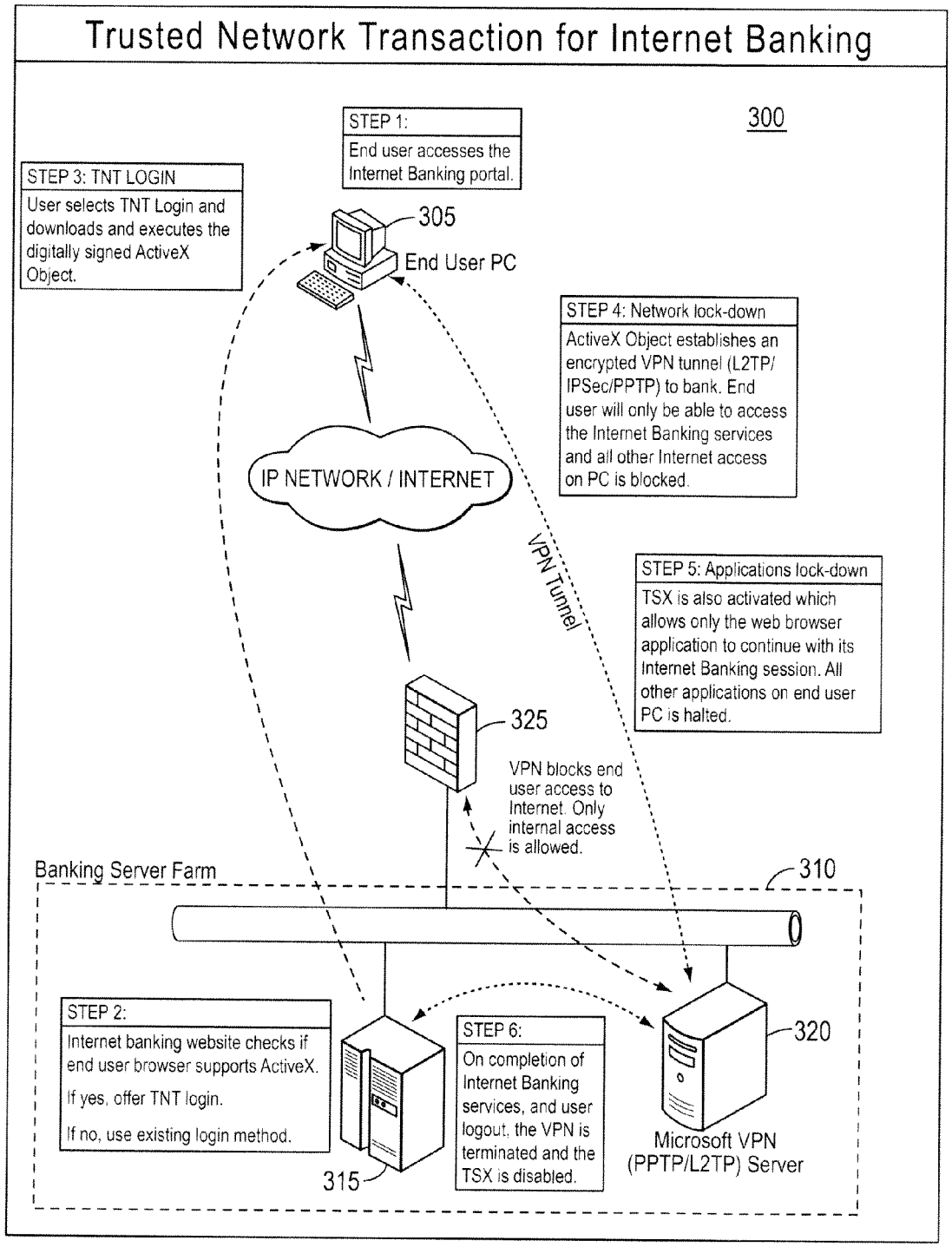
FIG. 3 is a block diagram illustrating a network system operative to effect a trusted network transaction with an Internet banking portal, in accordance with an embodiment of the present invention.

FIG. 3 is a block diagram illustrating a network system 300 operative to effect a trusted network transaction (TNT) with an Internet banking portal, in accordance with an embodiment of the present invention.

As shown, in step 1, the end user accesses his original Internet banking portal URL via a browser 135 installed on an insecure end-user device 105.

In step 2, the existing Internet banking login page detects whether the end user's browser 135 is capable of supporting TNT, e.g., supports ActiveX controls. If so, the Internet server 315 displays the Internet banking login page with an additional "button" for the end user to selectively enable TNT security. If the end-user device 105 cannot support TNT, then the original Internet banking login page is displayed without the TNT button.

In step 3, the end user clicks on the TNT button, which causes the Internet banking server 315 to download the install agent 182, e.g., an ActiveX control, to the end-user device 105. The end-user device 105 confirms that the install agent 182 is digitally signed by the bank, which is a trusted party by the end-user device 105. The end-user device 105 allows the trusted install agent 182 to execute.

In step 4, the install agent 182 establishes a VPN tunnel to a predefined VPN server 320 in the banking server farm 310 and establishes predefined VPN authentication credentials. After the VPN tunnel is established, all network traffic from the end-user device 105 is sent to the VPN server 320. That is, the end-user device 105 is disconnected from the rest of the Internet. The VPN server 320 (or a firewall) manages network resources accessible by the end-user device 105. That is, only network resources (e.g., the Internet banking web site) required for Internet banking transactions are made accessible to the end-user device 105.

In step 5, the security engine 177 is downloaded over the VPN. Armed with the security engine 177, an application lockout module 220 may be used to suspend applications not required for the Internet banking transaction and to prevent new applications from being executed.

In step 6, after the end user completes all Internet banking transactions and requests logout, the install agent 182 may be downloaded again. The install agent 182 detects the previously existing active TNT session, removes the security engine 177, and terminates the VPN tunnel before ending the install agent 182 process.

Figure 4:
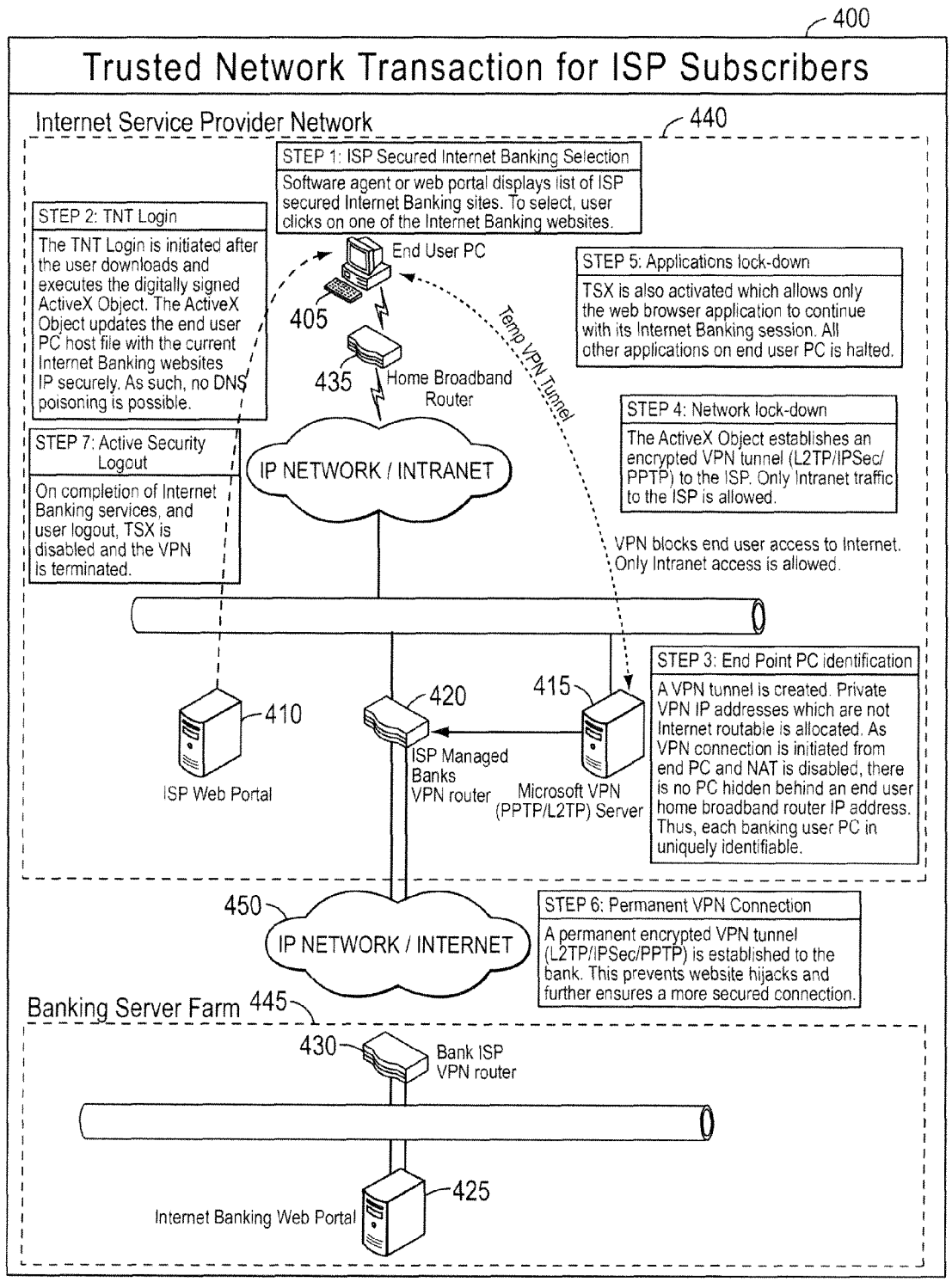
FIG. 4 is a block diagram illustrating a network system operative to effect a trusted network transaction managed by the end user's Internet service provider, in accordance with an embodiment of the present invention.

FIG. 4 is a block diagram illustrating a network system 400 operative to effect a TNT by an end-user device 405 with a banking portal, the TNT being managed by the end user's ISP network 440, in accordance with an embodiment of the present invention. In one embodiment, the end user's ISP network 440 may provide TNT protection for multiple transaction sites 120. The network system includes the ISP network 440 coupled via the Internet 450 to a banking server farm 445. The ISP network 440 includes the end-user device 405 coupled via an intranet 435 to an ISP server 410, to a VPN server 415, and to a VPN router 420. The banking server farm 445 includes a banking server 425 and a VPN router 430. The VPN router 420 of the ISP network 440 is coupled to the VPN router of the banking server farm 445 via the Internet 450.

In step 1, the end-user device 405 accesses the banking server 425 via a software application, e.g., the connection agent 130, that enables the user to select from multiple specific URLs of TNT-enabled sites 120. Upon selection of a URL, the software application is configured to direct the browser 135 to the selected URL. The list of specific URLs may be installed on the end-user device 405 by the ISP 410 or may be available on the portal page of the ISP 410. Alternatively, the end-user device 405 may navigate directly to the banking server 425, possibly via a TNT "button" from the site presented by the ISP server 410.

In step 2, the end user selects the URL of the transaction network 120 to access with TNT protection. The connection agent 130 establishes a preliminary VPN with the ISP server 410. The install agent 182 is downloaded from the ISP server 410 (or other trusted source dedicated to supporting TNT for the banking site 425). The end-user device 405 is informed that the install agent 182 is digitally signed by the ISP server

410, which is a trusted by the end-user device 405. The end-user device 405 allows the install agent 182 to execute. The install agent 182 may be embedded with the latest IP addresses of the TNT-enabled sites or VPN servers (independent of DNS updates propagation delays or DNS security risks). The OS host file of the end-user device 105 may be updated by the install agent 182 with the IP addresses to prevent URL redirection for TNT protected sites due to DNS poisoning. Any changes to the TNT-managed IP addresses may be controlled by the ISP server 410. A transaction network 120, e.g., banking server 425, informs the ISP server 410 whenever changes in the IP addresses of web servers occur (instead of depending on Internet DNS updates).

In step 3, the install agent 182 establishes a VPN tunnel to the VPN server 415 using predefined VPN authentication credentials specified in the ISP server's web page (from the URL selected in Step 2). The VPN authentication credentials can be uniquely created from each TNT session to associate the specific end-user device 405 to access the banking server 425, even if the end-user device 405 is hidden behind an NAT router. For example, the VPN login userid could be the subscriber ISP userid+end-user device 105 MAC address or computer name (detected by the TNT ActiveX control)+target TNT site. This allows the ISP server 410 to track down the actual end-user device 405 performing online TNT transactions if there is any audit requirements or to "blacklist" an end-user device 105 (instead of the end user who can continuously change his login credentials) that regularly posts false offers for online auctions web sites, etc.

In step 4, after the temp VPN tunnel is established, all network traffic from the end-user device 405 is sent to the VPN server 415. That is, the end-user device 405 is disconnected from the rest of the Internet. The VPN server 415 (or a firewall) within the ISP network 440 manages the network resources accessible by the end-user device 405. That is, only network resources (e.g., the banking server 425) required for the Internet banking transactions are made accessible.

In step 5, the security engine 177 and/or security profiles 180 are downloaded, installed and executed. Using the application lockout module, the security engine 177 blocks applications not required for the Internet banking transactions and prevents new applications from being executed. Other TNT protection mechanisms may also be used. The transaction network VPN manager 250 establishes a VPN tunnel with the VPN server 415.

In step 6, the VPN server 415 is deployed. To ensure network security over the Internet 450 from the ISP network 440 to the banking server 425, a permanent VPN tunnel may be established between the ISP network 440 and the banking server 425, e.g., using the ISP-managed VPN router 420 and the bank-managed VPN router 430. This ensures that intermediate Internet routers between the ISP network 440 and the banking server 425 cannot hijack traffic to and/or from the end-user device 405. This also allows the banking server 425 to manage additional network security policies within their own network on top of those provided by the ISP network 440.

In step 7, after the end user completes his Internet banking transactions and requests logout, the install agent 182 is downloaded again from the ISP server 410. The install agent 182 detects the previous existing active TNT session, removes the security engine 177, and terminates the VPN tunnel before ending the install agent 182 process.

Combinations of the various techniques described in this invention could be used in an actual deployment of TNT. Various alternative technologies, e.g., a Java applet instead of Microsoft ActiveX, SSL instead of PPTP VPN tunnel, etc., can be used.

Figure 5:
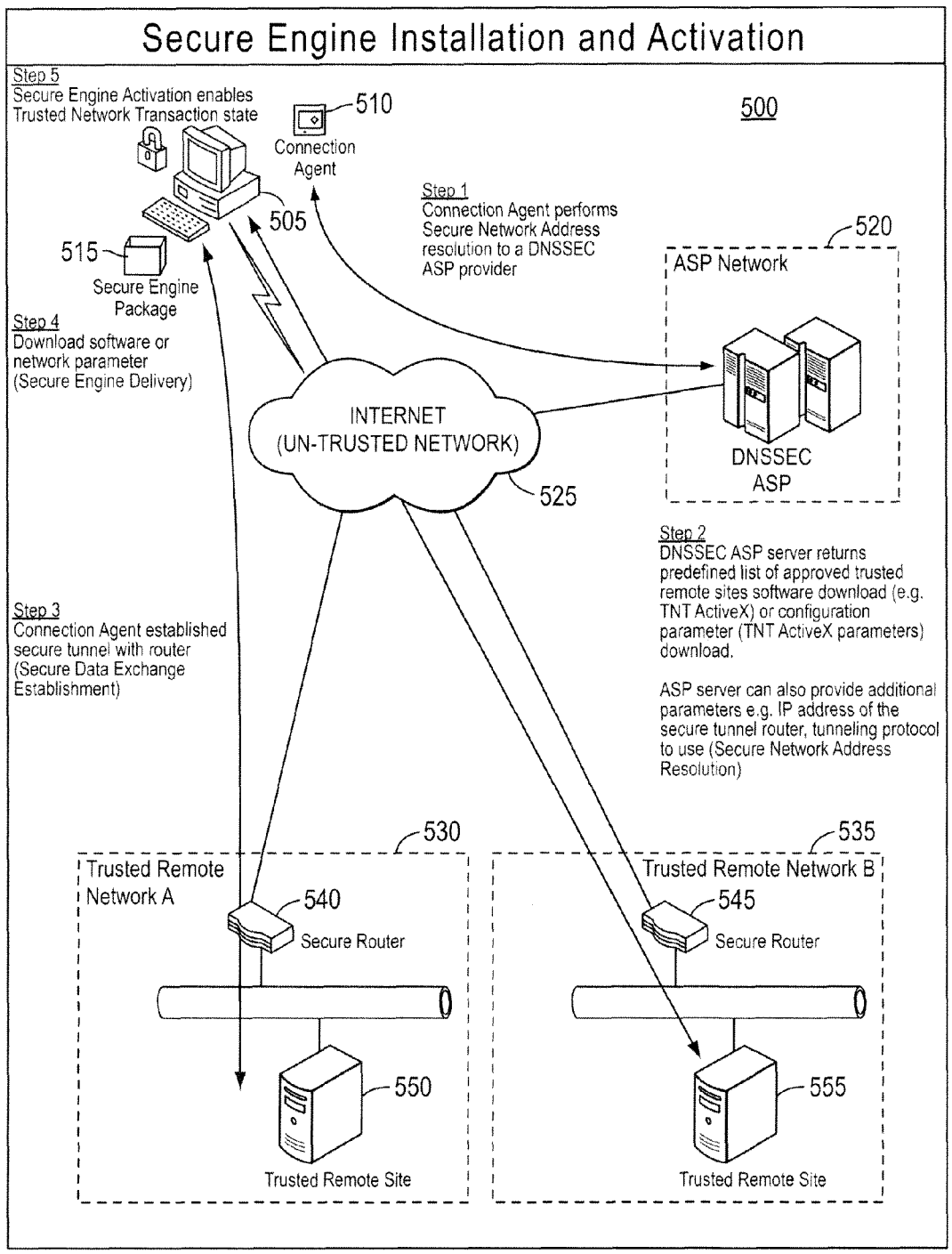
FIG. 5 is a block diagram illustrating a network system operative to effect security engine installation, in accordance with an embodiment of the present invention.

FIG. 5 is a block diagram illustrating a network system 500 operative to effect security engine installation, in accordance with an embodiment of the present invention.

In step 1, the connection agent 130 uses a pre-configured and unchangeable network address to contact a secure network address resolution service 520 to obtain the network address of a trusted source of the security engine 515 or a list of trusted sources. For example, an IP address of a trusted DNS security extensions (DNSSEC) server 520 may be pre-configured in the connection agent 130.

In step 2, the connection agent 130 uses this IP address to connect to the DNSSEC server 520 to resolve the domain name of the trusted source to an IP address. In another embodiment, the DNSSEC server 520 may download a list of approved sites, from which the end-user device 505 may select a URL of the trusted source of the security engine 515.

In step 3, using the network address of the trusted source, the connection agent 130 establishes a secure data exchange with the trusted source, preventing network traffic from the end-user device 105 from being misdirected to untrusted sources and guarding against other forms of network intrusion and attacks. For example, in a TCP/IP network, in connection agent 130 may use the resolved IP address to connect to the trusted source, e.g., via a secure tunnel. This connection technique ensures that the network address is accurate (e.g., not poisoned by a DNS attack), and assures that the end-user device 105 connects to the intended trusted source. Further communication protocols employed in the secure network address resolution service 520 ensures that communication to and from the end-user device 105 is authenticated, authoritative and accurate.

In step 4, with a secure exchange established, the end-user device 105 downloads the security engine 515, e.g., using protocols like HTTP or FTP. The secure tunnel established by the connection agent 130 ensures that data traffic between the end-user device 105 and the trusted source is secure and cannot be compromised, even when insecure protocols like HTTP and FTP are used.

In step 5, after delivery of the security engine 515, the end-user device 105 executes the security engine 515. The security engine 515 effectively secures the end-user device 105, e.g., allows the end-user device 105 to communicate only with trusted transaction sties, e.g., trusted remote network 535, prevents other applications 145 running on the end-user device 105 from capturing or sending information, especially to untrusted sites, etc. The user can then access and interact with the transaction sites in confidence.

Figure 6:
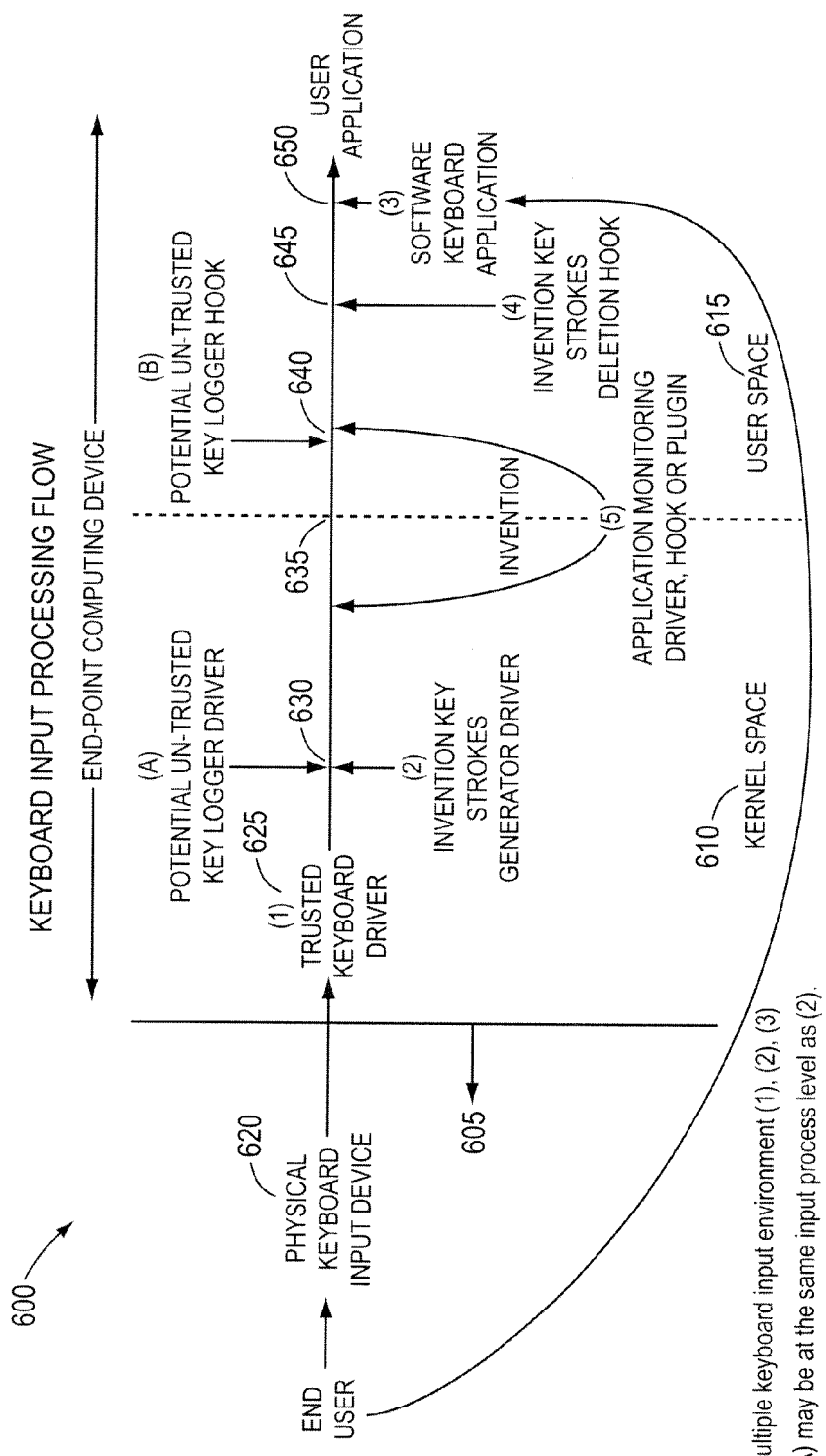
FIG. 6 is a timing diagram illustrating keyboard-input processing, in accordance with an embodiment of the present invention.

FIG. 6 is a hierarchial level diagram illustrating keyboard-input processing flow 600, in accordance with an embodiment of the present invention. Flow 600 is divided into physical space 605, kernel space 610, and application space 615. In physical space 605, the end user makes keystrokes on the keyboard at level 620. In kernel space 610, the trusted keyboard driver receives keystrokes at level 625. The keystrokes generator driver resides and generates fake keystrokes at level 630. The potential untrusted keylogger driver captures keystrokes at level 620 or thereafter. In application space 615, a potential untrusted keylogger hook potentially captures keystrokes at level 640. The keystrokes deletion hook removes fake keystrokes at level 645. The application receives the cleaned keystroke pattern at level 650. Somewhere between level 630 in kernel space and level 645 in application space 615, an application monitoring hook, plugin and/or driver monitors application status, and possibly feeds information to the keystrokes generator driver at level 630.

FIG. 7 is a block diagram illustrating a network system 700 operative to effect tunnel datagram processing, in accordance with an embodiment of the present invention. The embodiment uses standard GRE and IPsec AH mechanisms to illustrate the tunneling mechanism. Embodiments of the invention may be applicable to other combinations of tunneling and data integrity protocols.

It is assumed that a GRE tunnel has been established between the end-user device 705 and a GRE router 735. The tunneling driver adds an AH header to the IP packet generated by the computing device 705. The AH header is used to authenticate with the authentication router 750a or 750b. The IP packet with AH header is further encapsulated in a GRE packet before it is sent out.

The GRE packet is transferred through the GRE tunnel via the Internet 710, until it reaches the GRE router 735. The GRE router 735 decapsulates the GRE packet back to the IP packet with AH header. Further, based on the source and destination IP addresses, the GRE router 735 routes the decapsulated packet to an authentication router 750a or 750b.

Before the packet reaches the authentication router 750a or 750b, it passes through a firewall 745, which performs egress filtering to ensure that access only to intended resources is allowed and that access to forbidden resources is blocked.

Upon receiving the IP AH packet, the authentication router 750a and 750b performs an authentication check to ensure that the packet comes from the computing device 705. It removes the AH header and routes the packet to the intended resources 720a, 720b or 720c. That is, the packet is returned back to the format as originally generated by the computer device 705.

The intended resource processes the packet and generates a reply to the authentication router 750a or 750b.

The authentication router 750a or 750b adds an AH header to the reply packet. The AH header is used to authenticate any remote network resources 720a, 720b or 720c. The authentication router 750a or 750b routes the new IP AH packet back to the GRE server 735.

The GRE router 735 encapsulates the reply packet and sends it back to the end-user device 705 via the tunnel.

The tunneling driver on the end-user device 705 decapsulates the packet and verifies the AH header. If the AH header passes the check, the packet is trusted as coming from the authenticated remote network resources 720a, 720b or 720c. The AH header is removed before the packet is passed to the upper layer of the network stack for further processing. If the AH header fails the check, then a security measure is taken. The measure could include breaking the tunnel or alerting the end user.

There are many other possible variation of the example described. The authentication server 750a or 750b can be moved outband of the communication between the end-user device 705 and the network resources 720a, 720b or 720c. The authentication server 750a or 750b can communicate with the GRE router 735 to retrieve a checksum of packets received from the tunnel and can encrypt it with a private key whose public key is known to the tunneling software. The encrypted checksum may be transferred to the tunnel software regularly in a separate channel so that the tunnel software is able to ensure that it is communicating with the actual remote network resource 720a, 720b or 720c.

Certain embodiments facilitate the use of data protection mechanisms to have negligible demand on the end user and end-user device. In one embodiment, the end user need only select the network software application that the end user wants to use to exchange data and the trusted remote network with which the end user wishes to establish a secure data exchange session. After the data protection mechanism are enabled, the end user need not differentiate between trusted and untrusted software and remote networks. Further, certain embodiments enable minimal change to existing Internet banking or shopping sites, minimal TNT deployment effort, and minimal change to end user web site usage experience.

Figure 8:
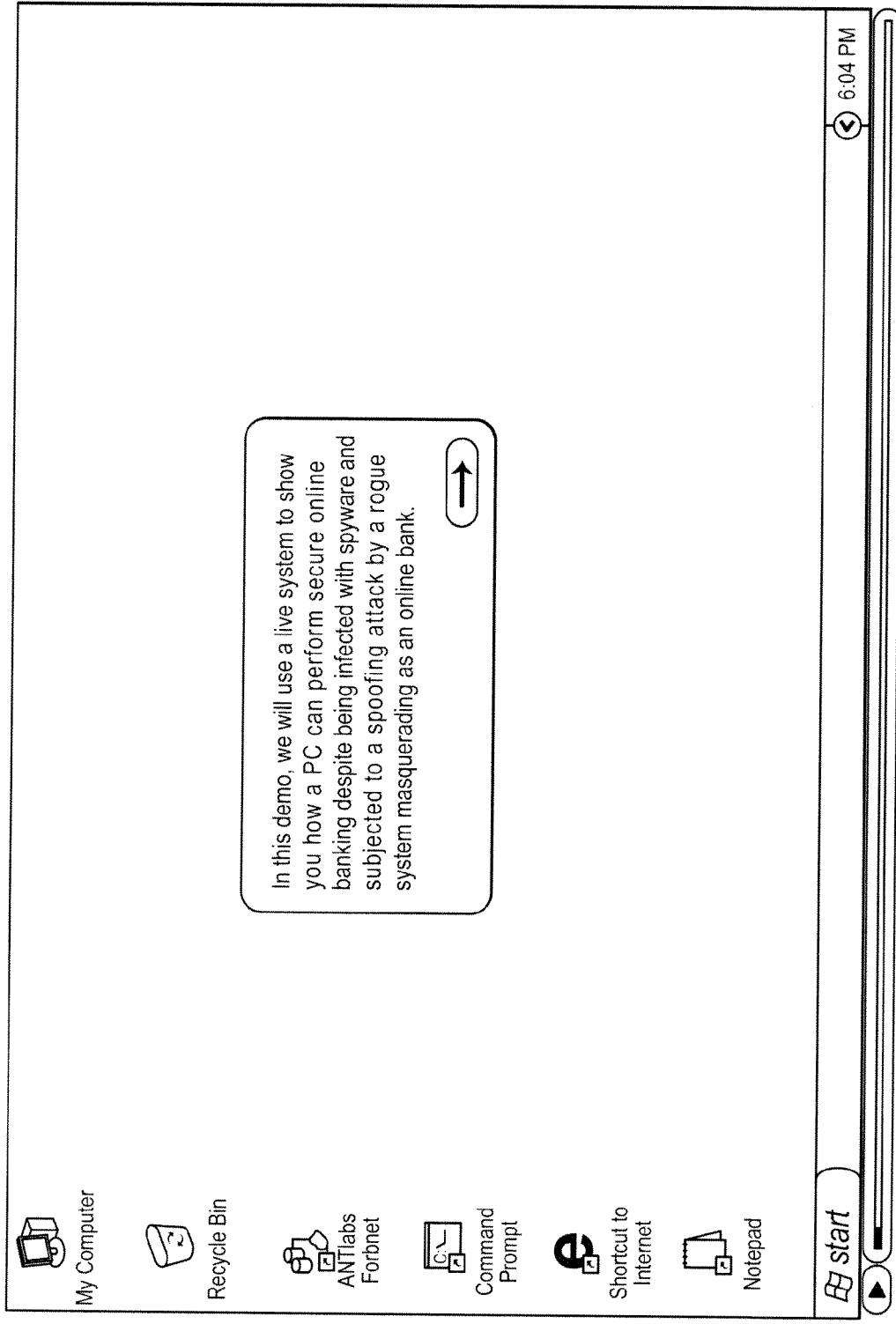
FIG. 8 is a screen shot of an end-user device before spyware infection or spoofing attack.

FIG. 8 is a screen shot of a desktop 805 on an end-user device 105 before spyware infection or spoofing attack.

Figure 9:
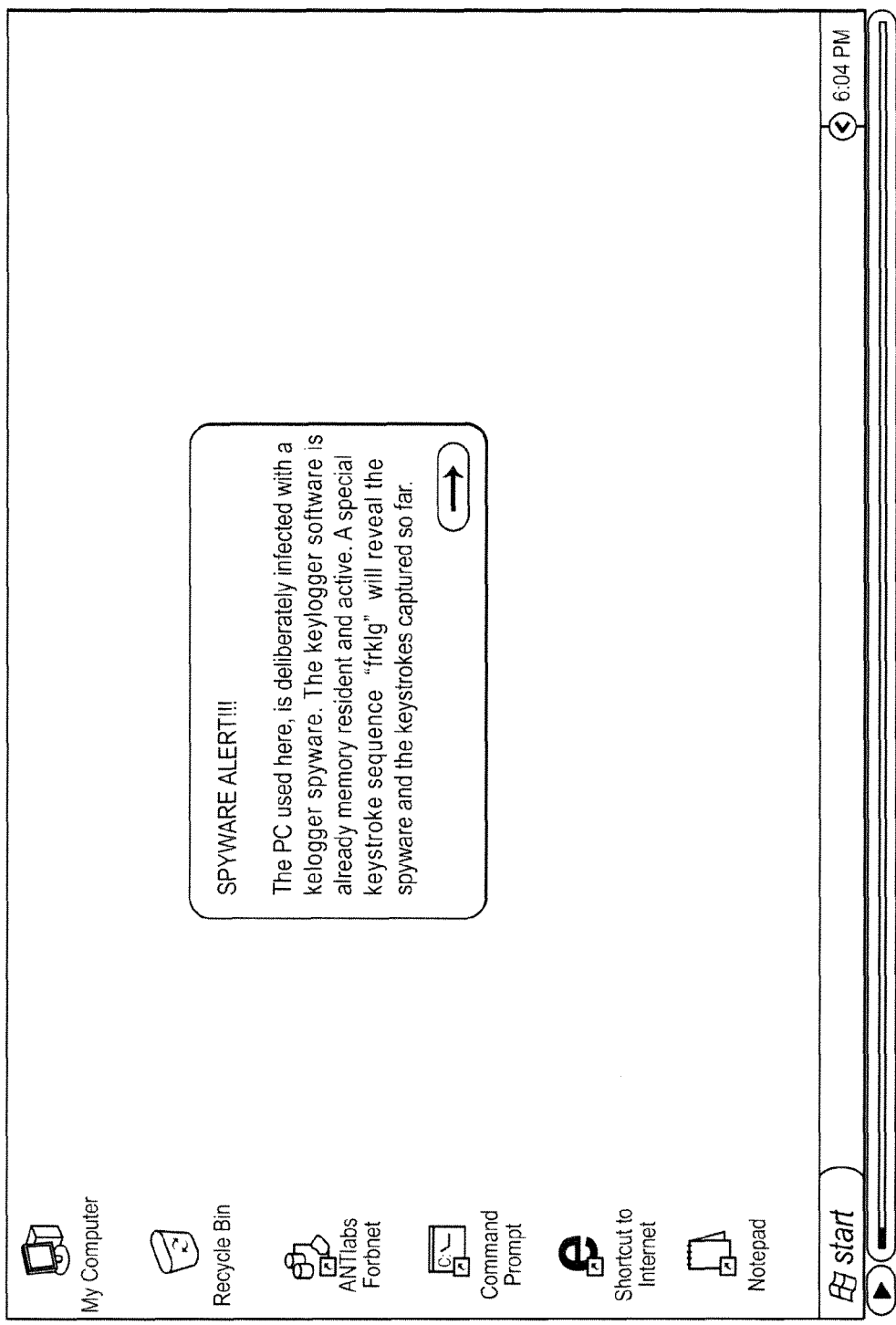
FIG. 9 is a screen shot of an end-user device after spyware infection.

FIG. 9 is a screen shot of the desktop 805 on an end-user device 105 after spyware infection.

Figure 10:
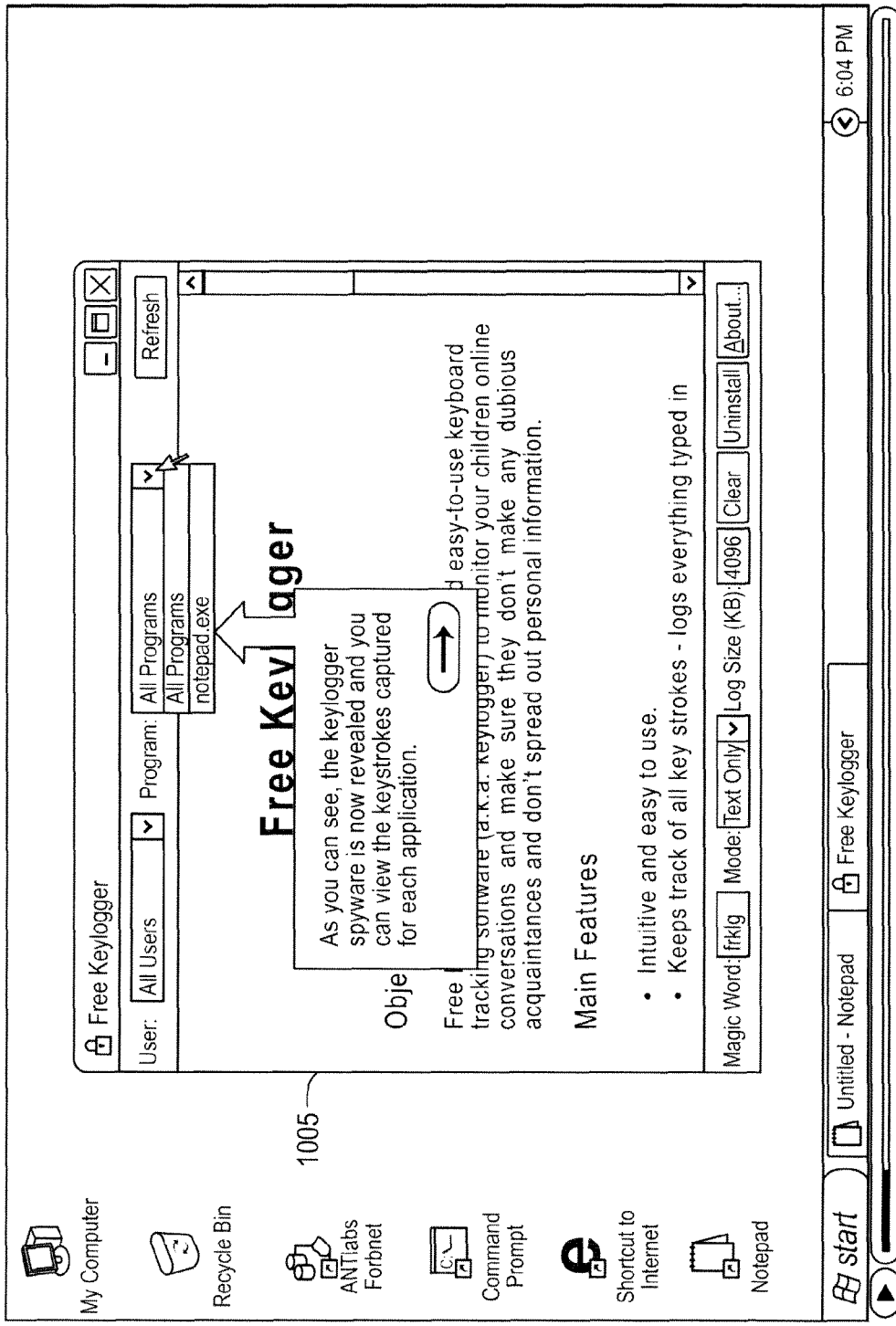
FIG. 10 is a screen shot of an end-user device with a window illustrating keylogger infection.

FIG. 10 is a screen shot of the desktop 805 of an end-user device 105 with a window 1005 illustrating keylogger infection.

Figure 11:
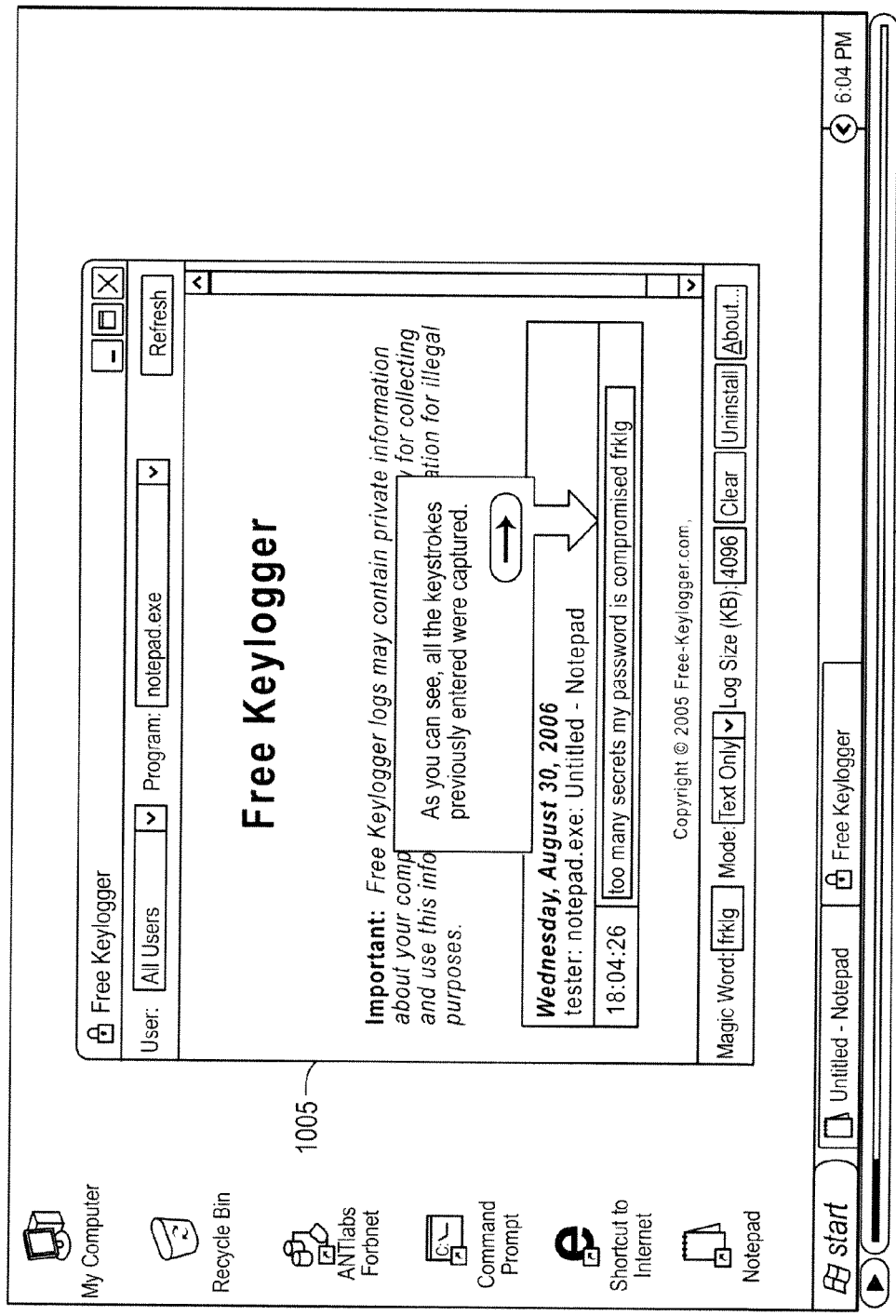
FIG. 11 is a screen shot of an end-user device with a window illustrating keystroke capture.

FIG. 11 is a screen shot of the desktop 805 on an end-user device 105 with a window 1105 illustrating keystroke capture.

Figure 12:
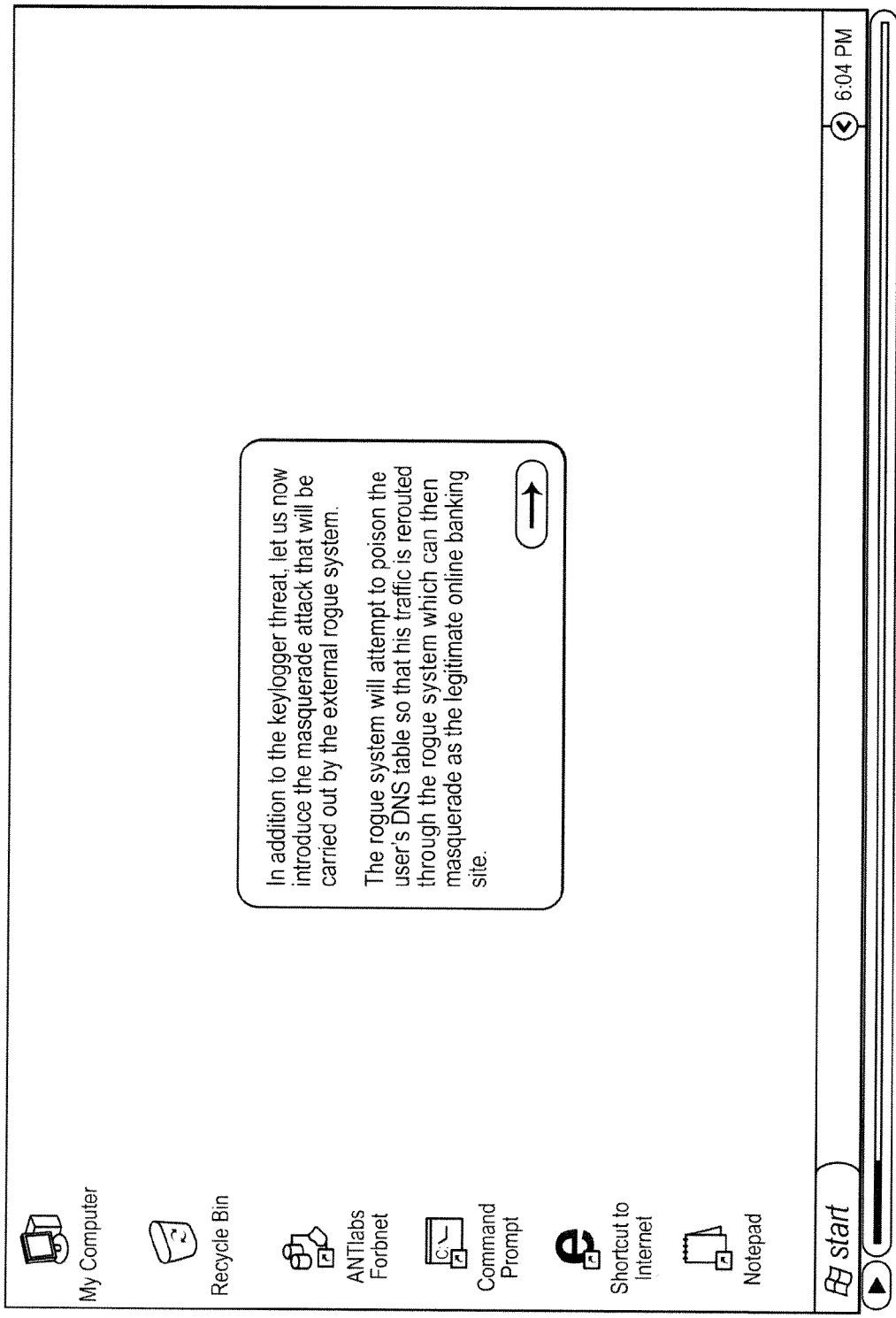
FIG. 12 is a screen shot of an end-user device before DNS poisoning.

FIG. 12 is a screen shot of the desktop 805 on an end-user device 105 before DNS poisoning.

Figure 13:
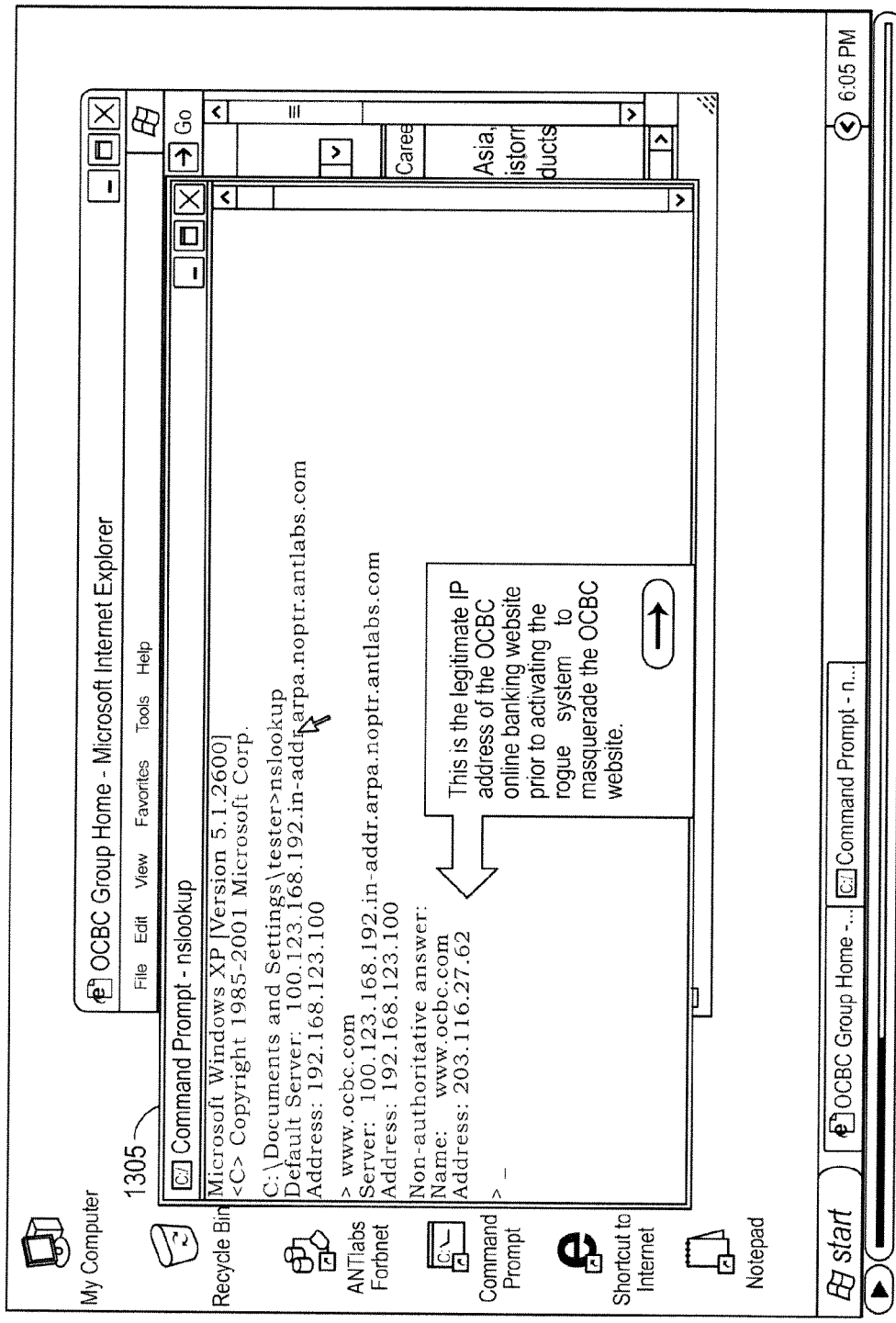
FIG. 13 is a screen shot of an end-user device with a window illustrating a legitimate IP address in a DNS cache, before DNS poisoning.

FIG. 13 is a screen shot of the desktop 805 on an end-user device 105 with a window 1305 illustrating a legitimate IP address in a DNS cache before DNS poisoning.

Figure 14:
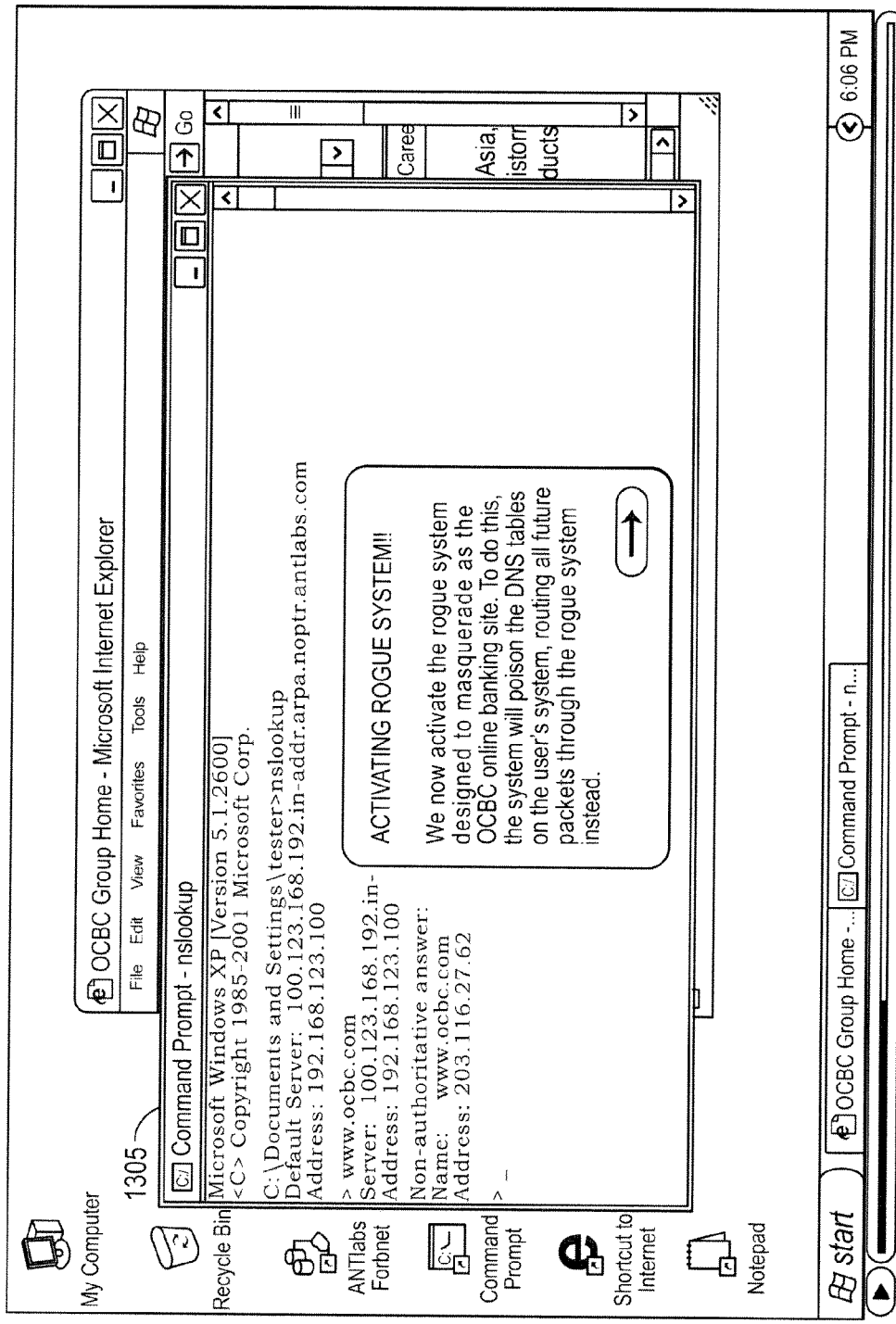
FIG. 14 is a screen shot of an end-user device after DNS poisoning.

FIG. 14 is a screen shot of the desktop 105 on an end-user device 105 with the window 1305 after DNS poisoning.

Figure 15:
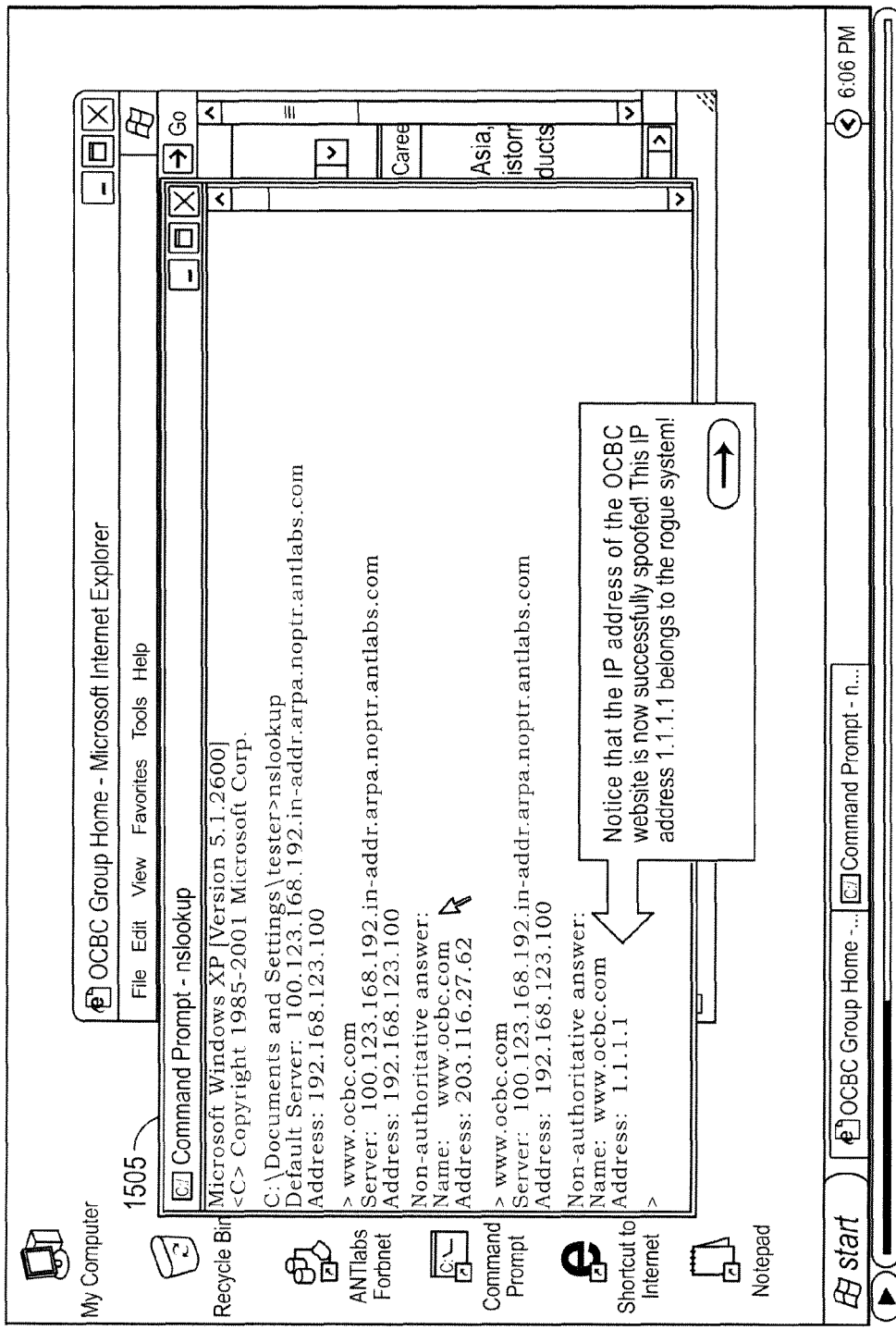
FIG. 15 is a screen shot of an end-user device with a window illustrating a spoofed IP address in the DNS cache, after DNS poisoning.

FIG. 15 is a screen shot of the desktop 805 on an end-user device 105 with a window 1505 illustrating a spoofed IP address in the DNS cache, after DNS poisoning.

Figure 16:
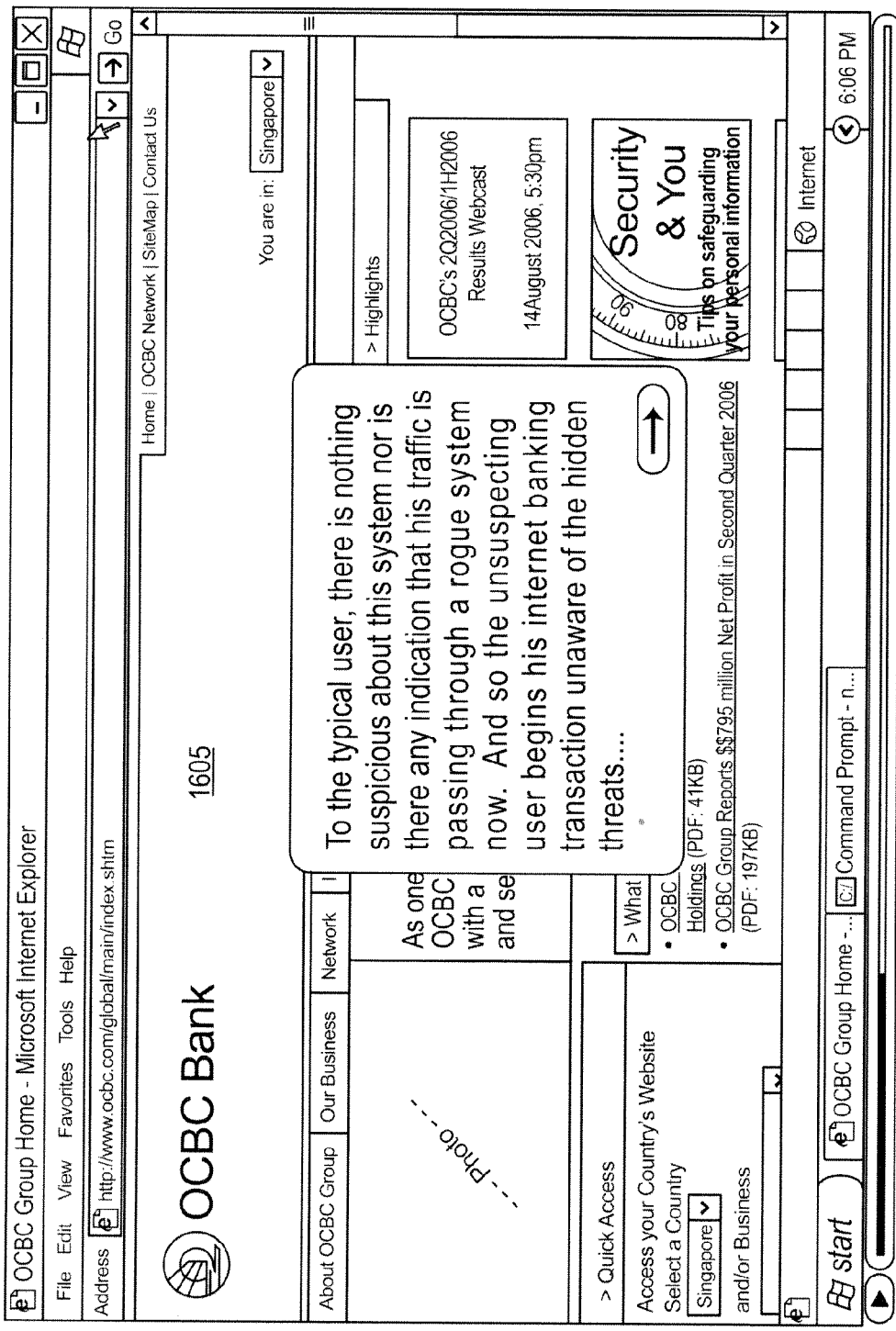
FIG. 16 is a screen shot of an end-user device with a browser window illustrating the spoofed site at the IP address of FIG. 15.

FIG. 16 is a screen shot of the desktop 805 on an end-user device 105 with a browser window 1605 illustrating the spoofed site at the IP address of FIG. 15.

Figure 17:
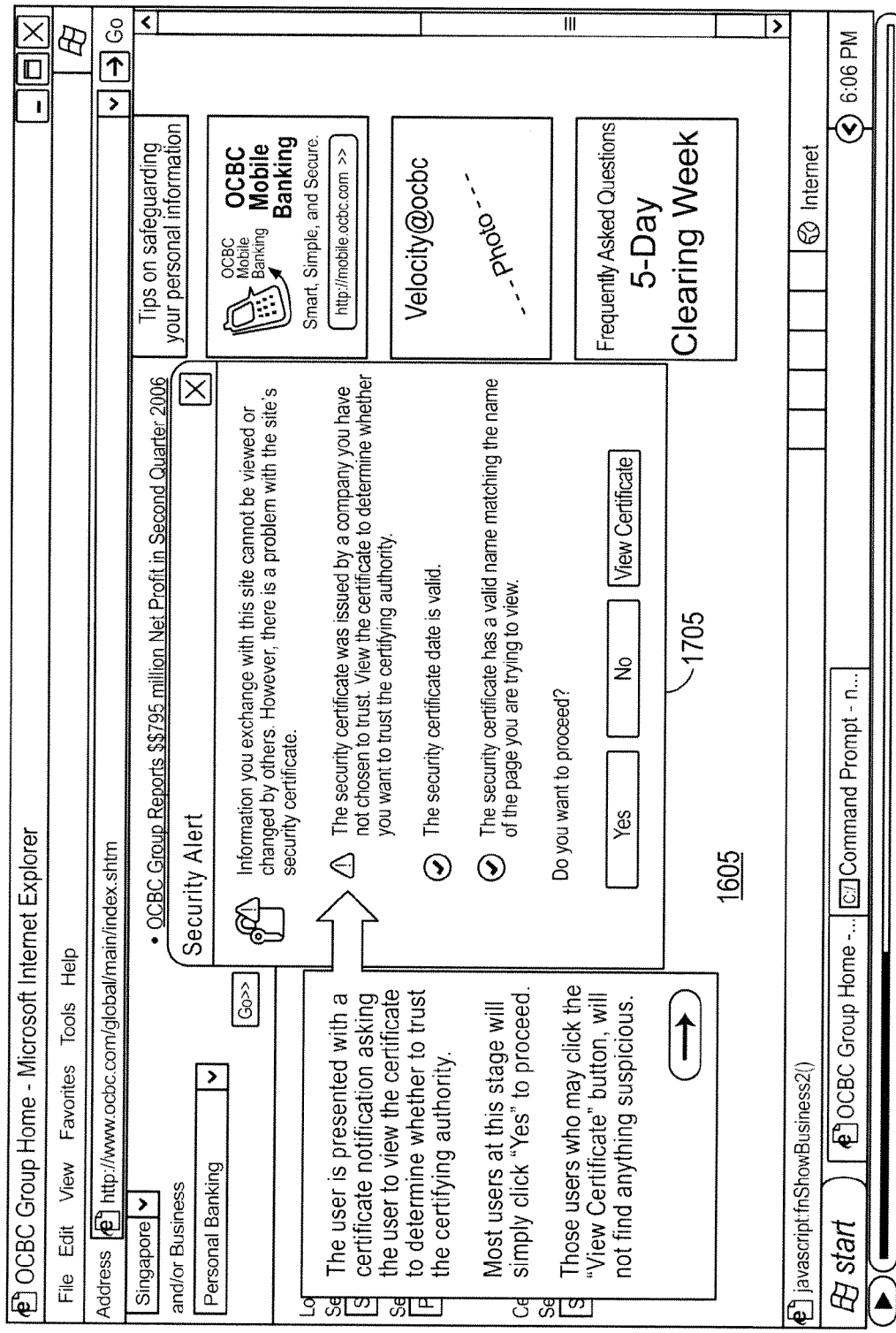
FIG. 17 is a screen shot of an end-user device with a browser window illustrating the spoofed site and with a security alert.

FIG. 17 is a screen shot of the desktop 805 on an end-user device 105 with a browser window 1605 illustrating the spoofed site and with a security alert 1705.

Figure 18:
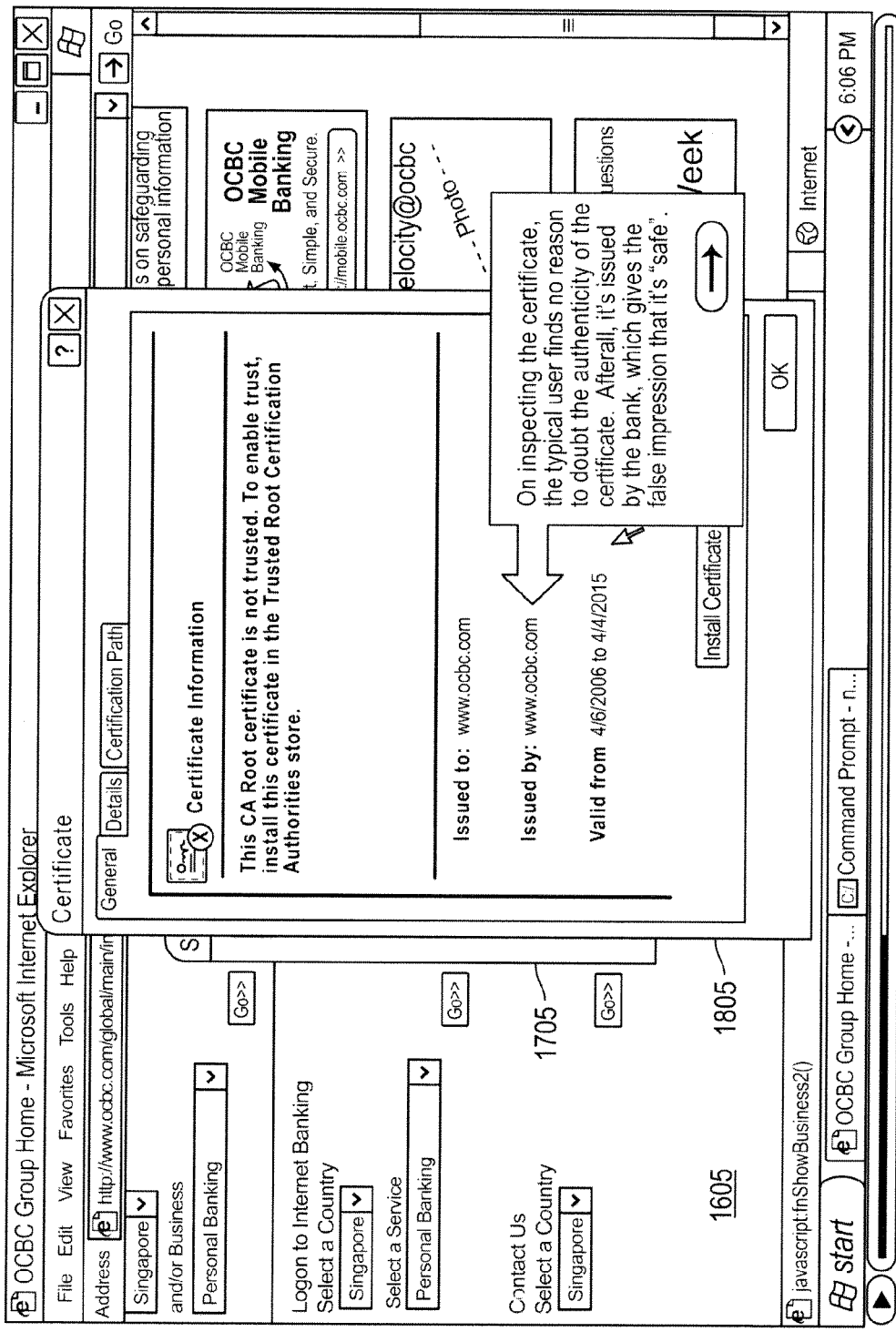
FIG. 18 is a screen shot of an end-user device with a browser window illustrating the spoofed site and with a spoofed security certificate.

FIG. 18 is a screen shot of the desktop 805 on an end-user device 105 with a browser window 1605 illustrating the spoofed site and with a spoofed security certificate 1805.

Figure 19:
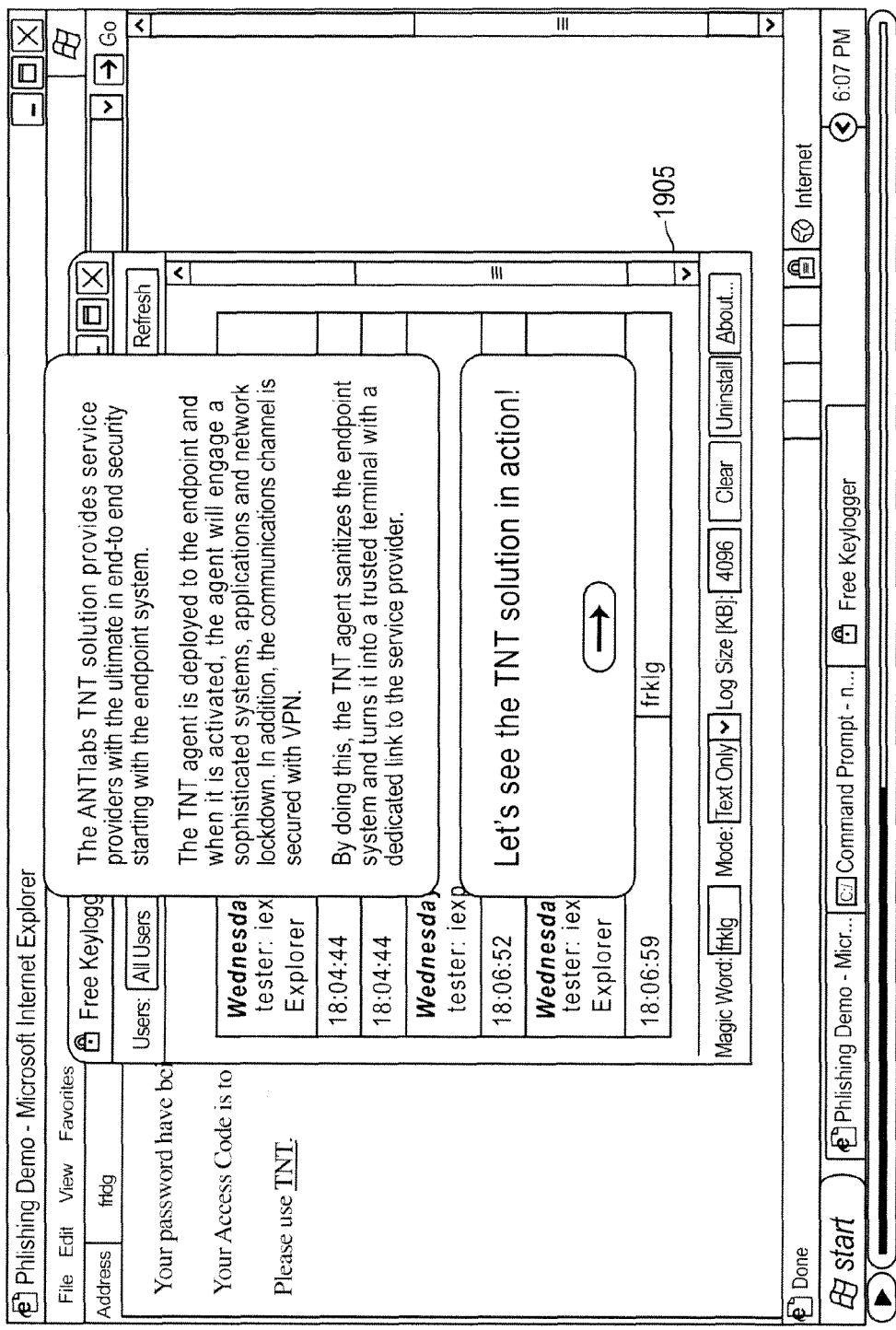
FIG. 19 is a screen shot of an end-user device after keylogger infection and DNS poisoning and before protection by embodiments of the invention.

FIG. 19 is a screen shot of the desktop 805 on an end-user device 105 with a window 1905 illustrating keylogger infection and after DNS poisoning but before protection by embodiments of the invention.

Figure 20:
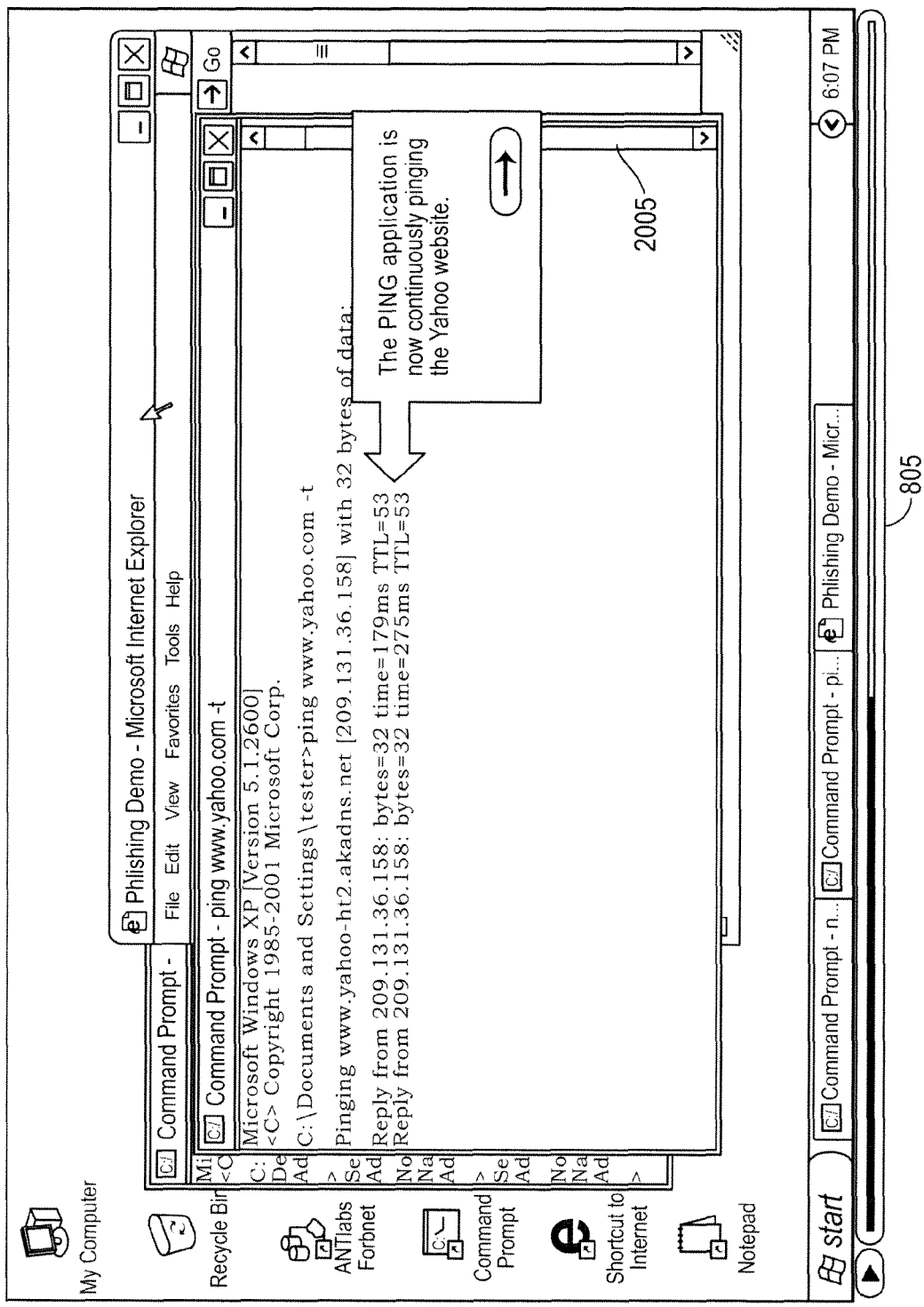
FIG. 20 is a screen shot of an end-user device with a window illustrating continuous pinging of the Yahoo website to evidence the availability of outbound communication.

FIG. 20 is a screen shot of the desktop 805 on an end-user device 105 with a window 2005 illustrating continuous pinging of the Yahoo website to evidence the availability of outbound communication.

Figure 21:
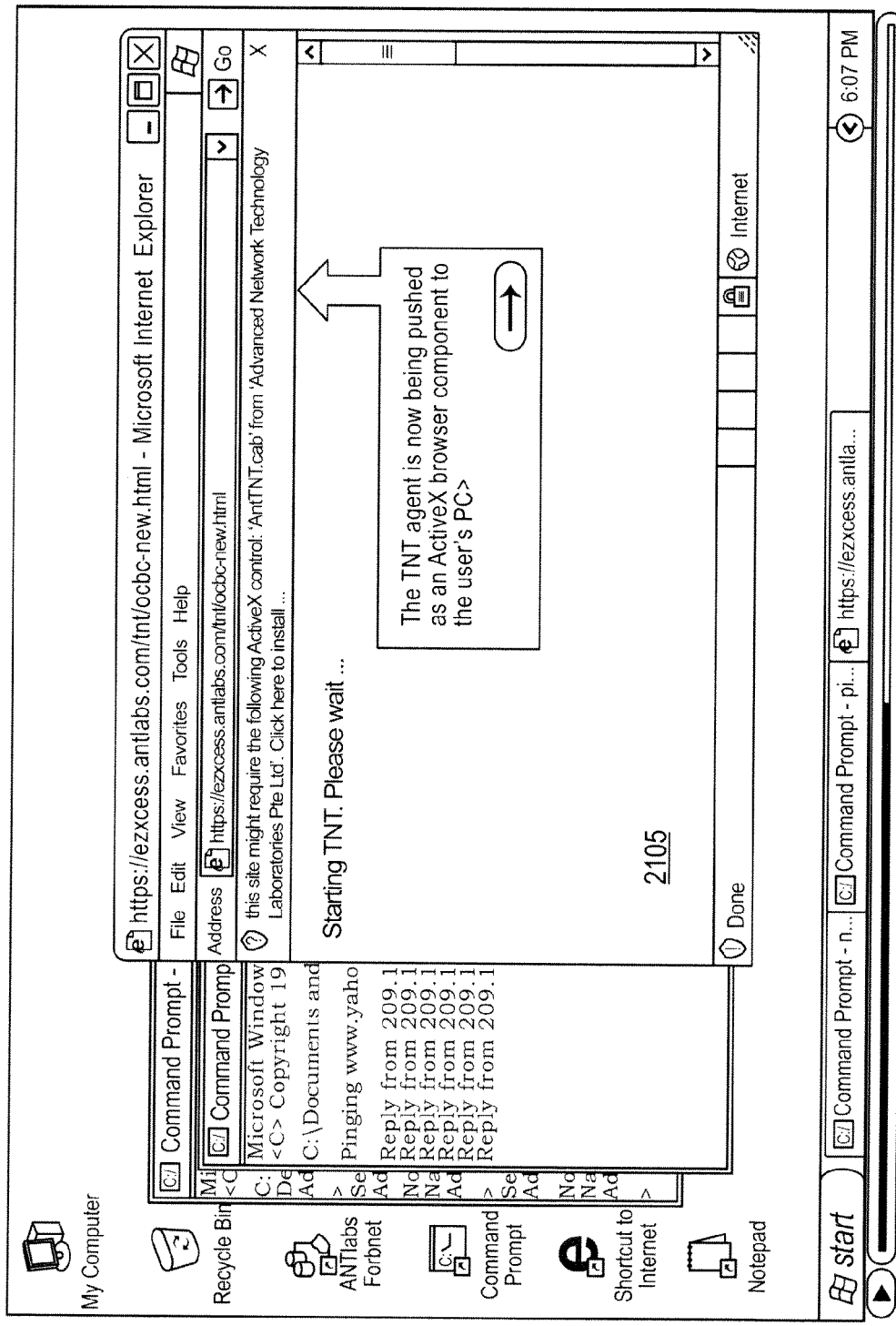
FIG. 21 is a screen shot of an end-user device with a window illustrating that a download agent, e.g., an ActiveX control, is being delivered to the end-user device.

FIG. 21 is a screen shot of the desktop 805 on an end-user device 105 with a window 2105 illustrating that a download agent, e.g., an ActiveX control, is being delivered to the end-user device.

Figure 22:
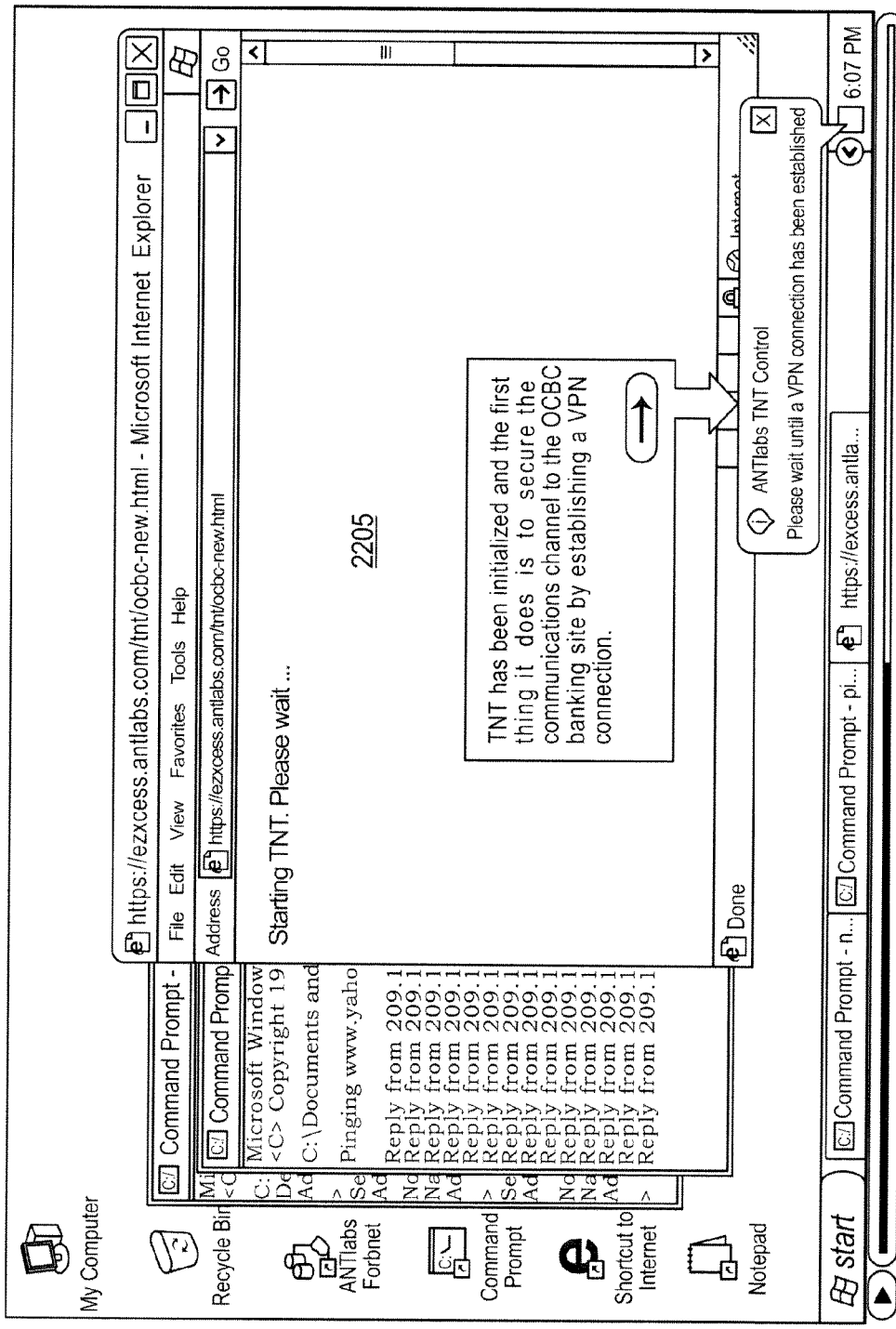
FIG. 22 is a screen shot of an end-user device with a window illustrating that the download agent is being executed and is establishing a VPN connection with a trusted source of a security engine.

FIG. 22 is a screen shot of the desktop 805 on an end-user device 105 with a window 2205 illustrating that the download agent is being executed and is establishing a VPN connection with a trusted source of a security engine 177.

Figure 23:
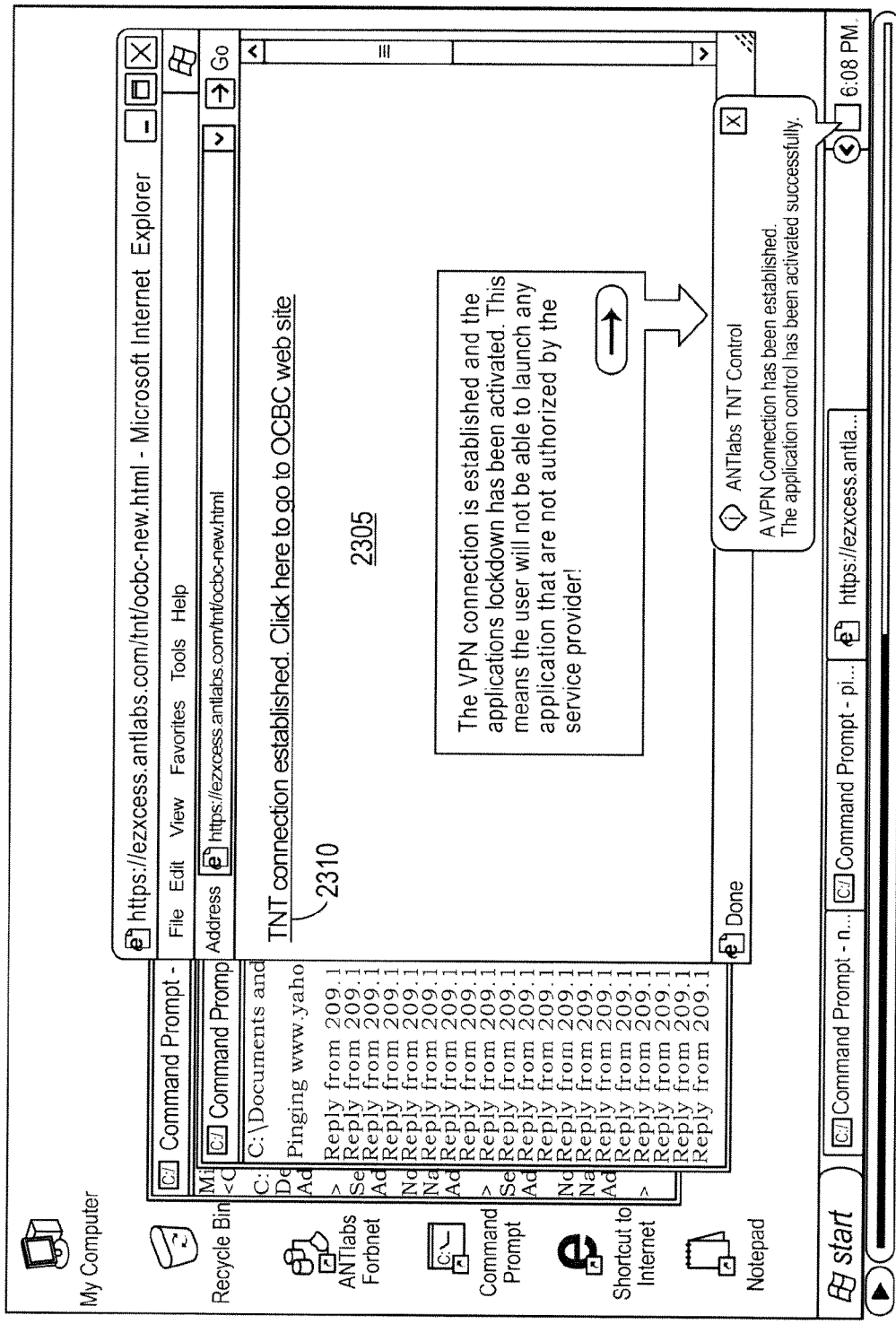
FIG. 23 is a screen shot of an end-user device with a window illustrating that the download agent has established a VPN connection with the trusted source, has downloaded and installed the security engine, and is presenting a button to navigate to the legitimate banking site.

FIG. 23 is a screen shot of the desktop 805 on an end-user device 105 with a window 2305 illustrating that the download agent has established a VPN connection with the trusted source, has downloaded and installed the security engine 177, and is presenting a button 2310 to navigate to the legitimate banking site. Installation of the security engine 177 enables network communication lockout, application lockout, driver management, keystroke pattern modification, and like TNT mechanisms.

Figure 24:
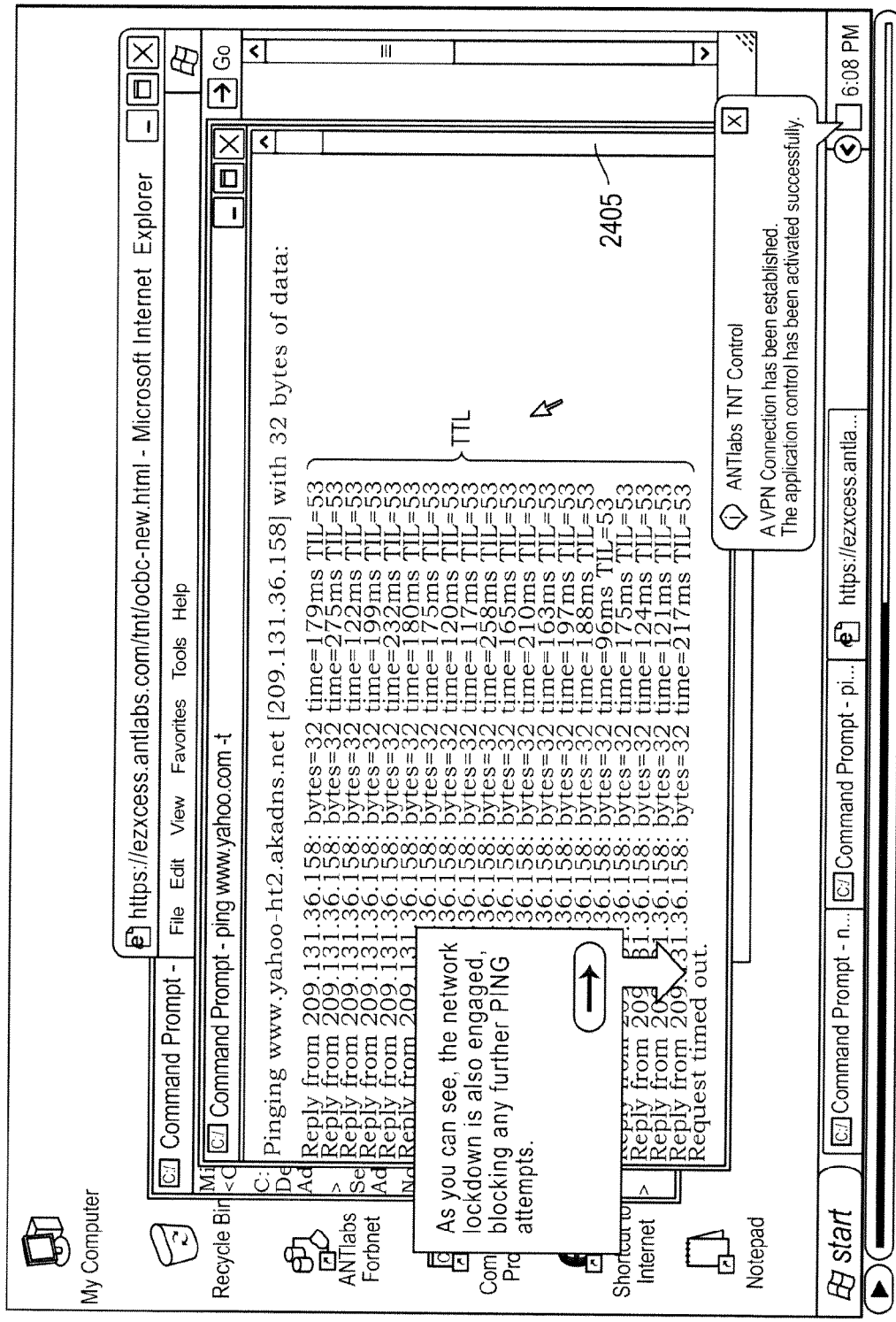
FIG. 24 is a screen shot of an end-user device with a window illustrating that the continuous pinging of the Yahoo website has stopped, evidencing that outbound communication has been suspended.

FIG. 24 is a screen shot of the desktop 805 on an end-user device 105 with a window 2405 illustrating that the continuous pinging of the Yahoo website has stopped, evidencing that outbound communication has been suspended.

Figure 25:
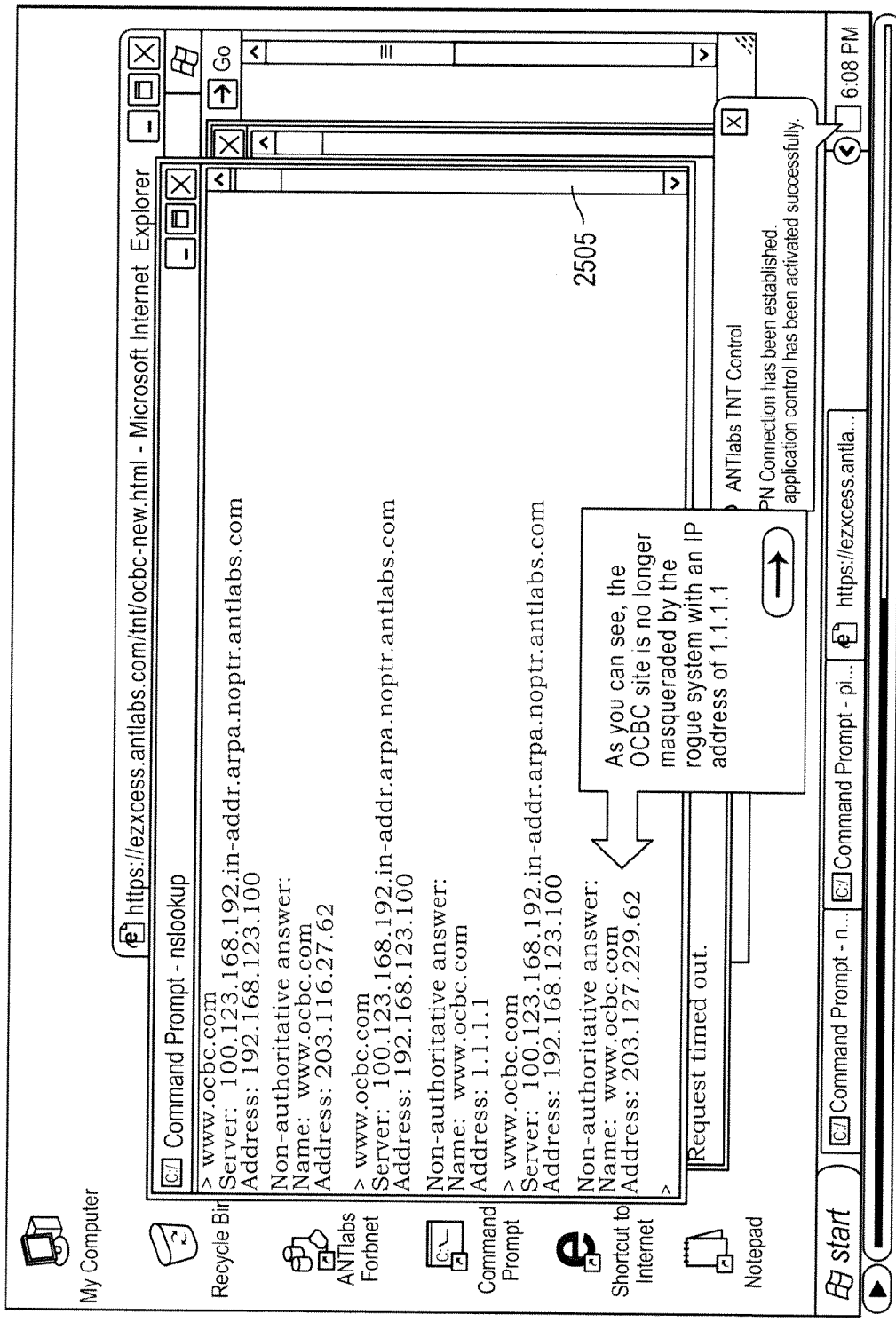
FIG. 25 is a screen shot of an end-user device with a window illustrating the legitimate IP address of the legitimate banking site.

FIG. 25 is a screen shot of the desktop 805 on an end-user device 105 with a window 2505 illustrating the legitimate IP address of the legitimate banking site.

Figure 26:
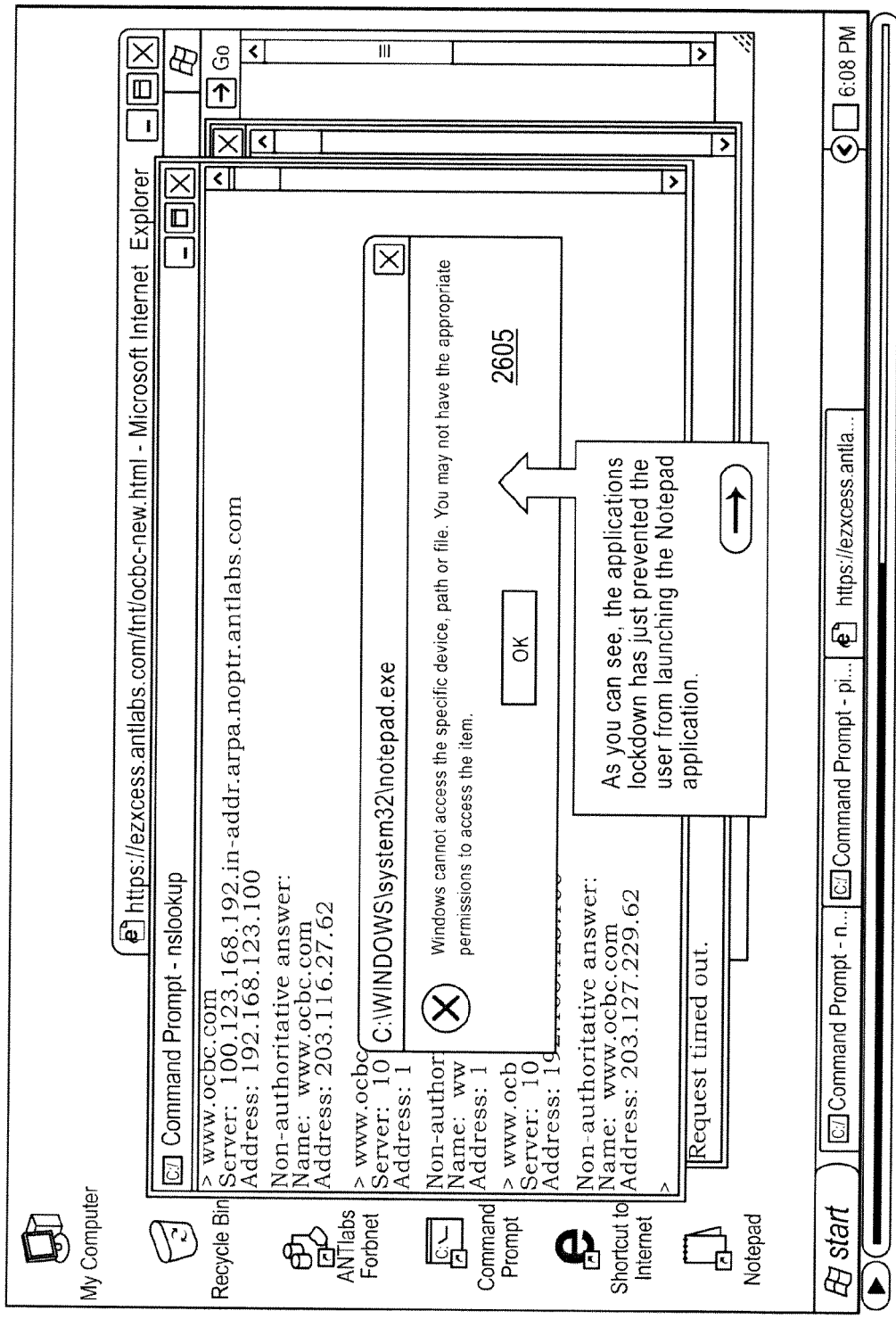
FIG. 26 is a screen shot of an end-user device with a window illustrating application lockout.

FIG. 26 is a screen shot of the desktop 805 on an end-user device 105 with a window 2605 illustrating application lockout.

Figure 27:
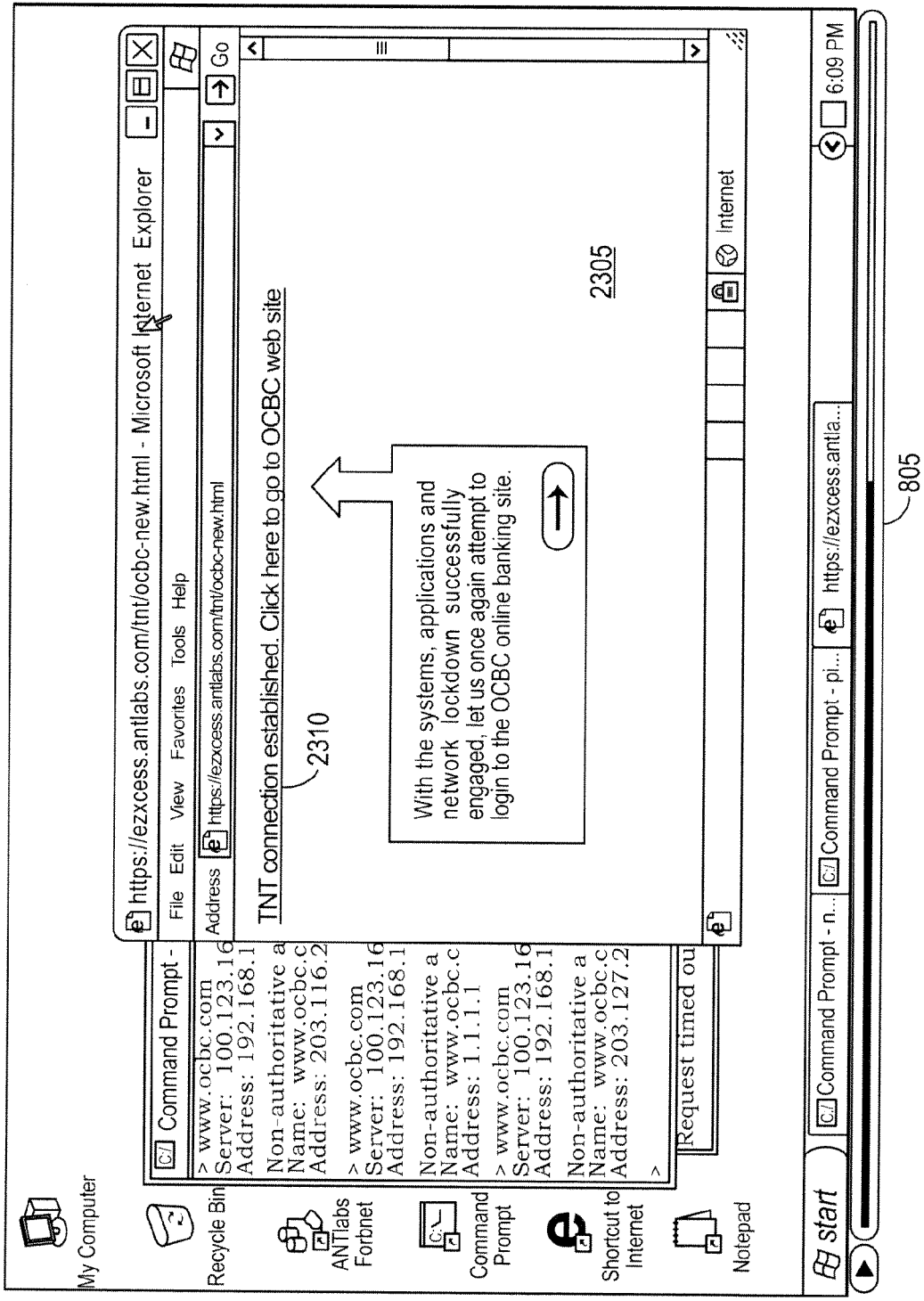
FIG. 27 is a screen shot of an end-user device with a window illustrating the button to navigate to the legitimate banking site.

FIG. 27 is a screen shot of the desktop 805 on an end-user device 105 with the window 2305 illustrating the button 2310 to navigate to the legitimate banking site.

Figure 28:
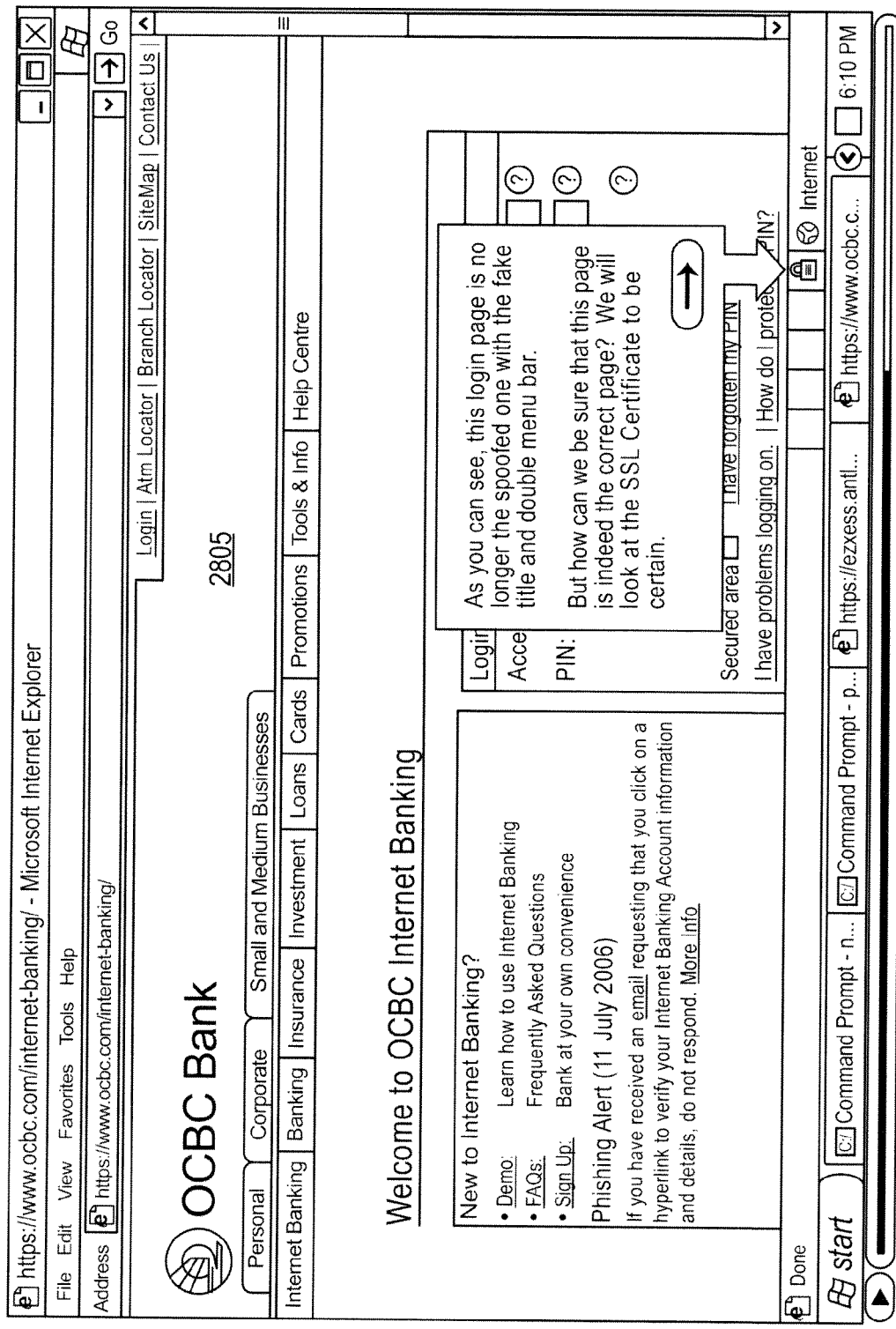
FIG. 28 is a screen shot of an end-user device with a browser window illustrating the legitimate banking site.

FIG. 28 is a screen shot of the desktop 805 on an end-user device 105 with a browser window 2805 illustrating the legitimate banking site.

Figure 29:
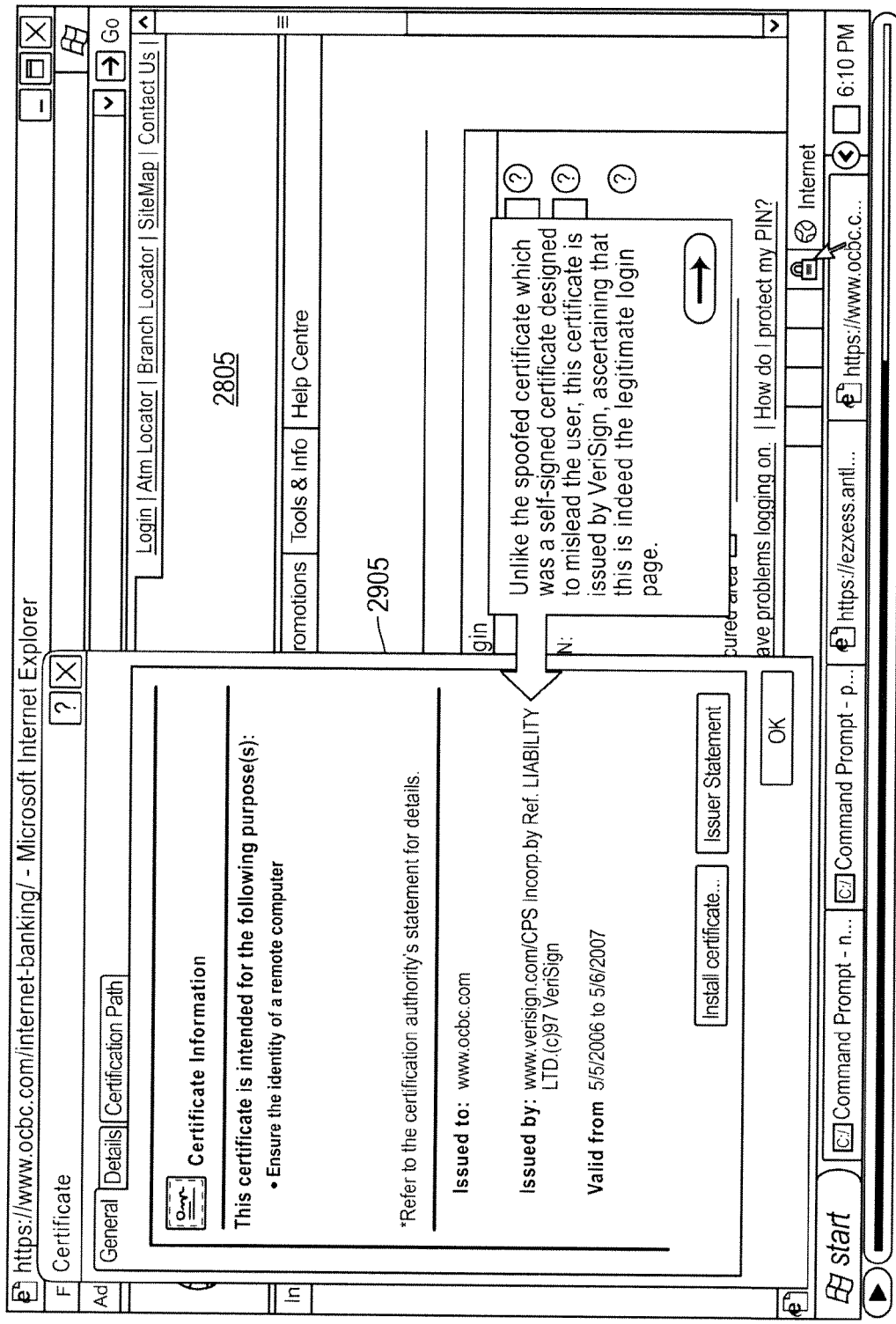
FIG. 29 is a screen shot of an end-user device with a window illustrating the legitimate banking site certificate of the legitimate banking site.

FIG. 29 is a screen shot of the desktop 805 on an end-user device 105 with the browser window 2805 and the legitimate banking site certificate 2905 of the legitimate banking site.

Figure 30:
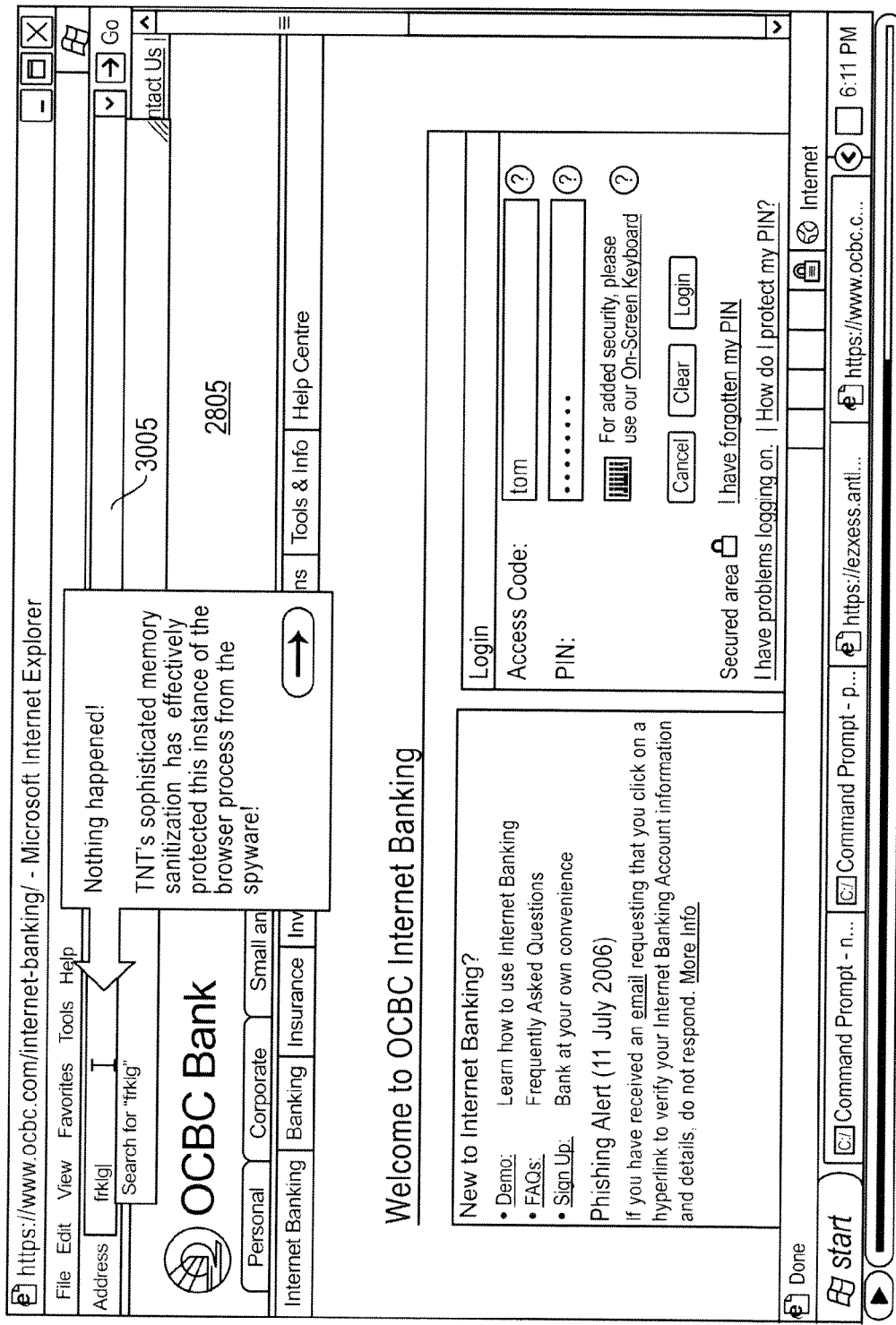
FIG. 30 is a screen shot of an end-user device with a browser window illustrating the legitimate banking site and illustrating that the keylogger is no longer active.

FIG. 30 is a screen shot of the desktop 805 on an end-user device 105 with the browser window 2805 of the legitimate banking site and illustrating that the keylogger is no longer active when the keylogger reveal word, "frklg," is typed in the address field 3005.

Figure 31:
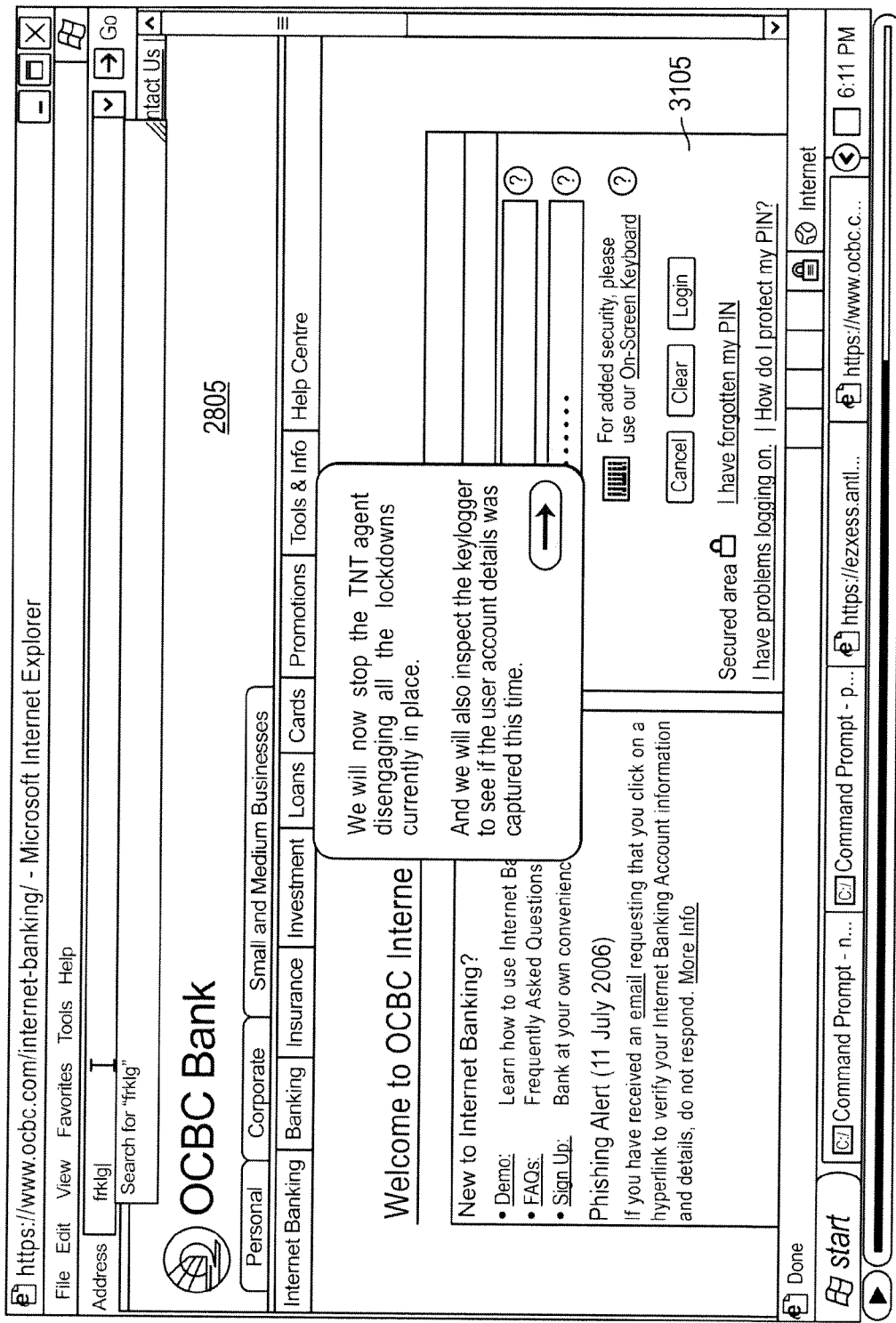
FIG. 31 is a screen shot of an end-user device with a browser window just before the security engine is deactivated and/or removed.

FIG. 31 is a screen shot of the desktop 805 on an end-user device 105 with the browser window 2805 and after entry of confidential data into the login window 3105, just before the security engine 177 is deactivated and/or removed.

Figure 32:
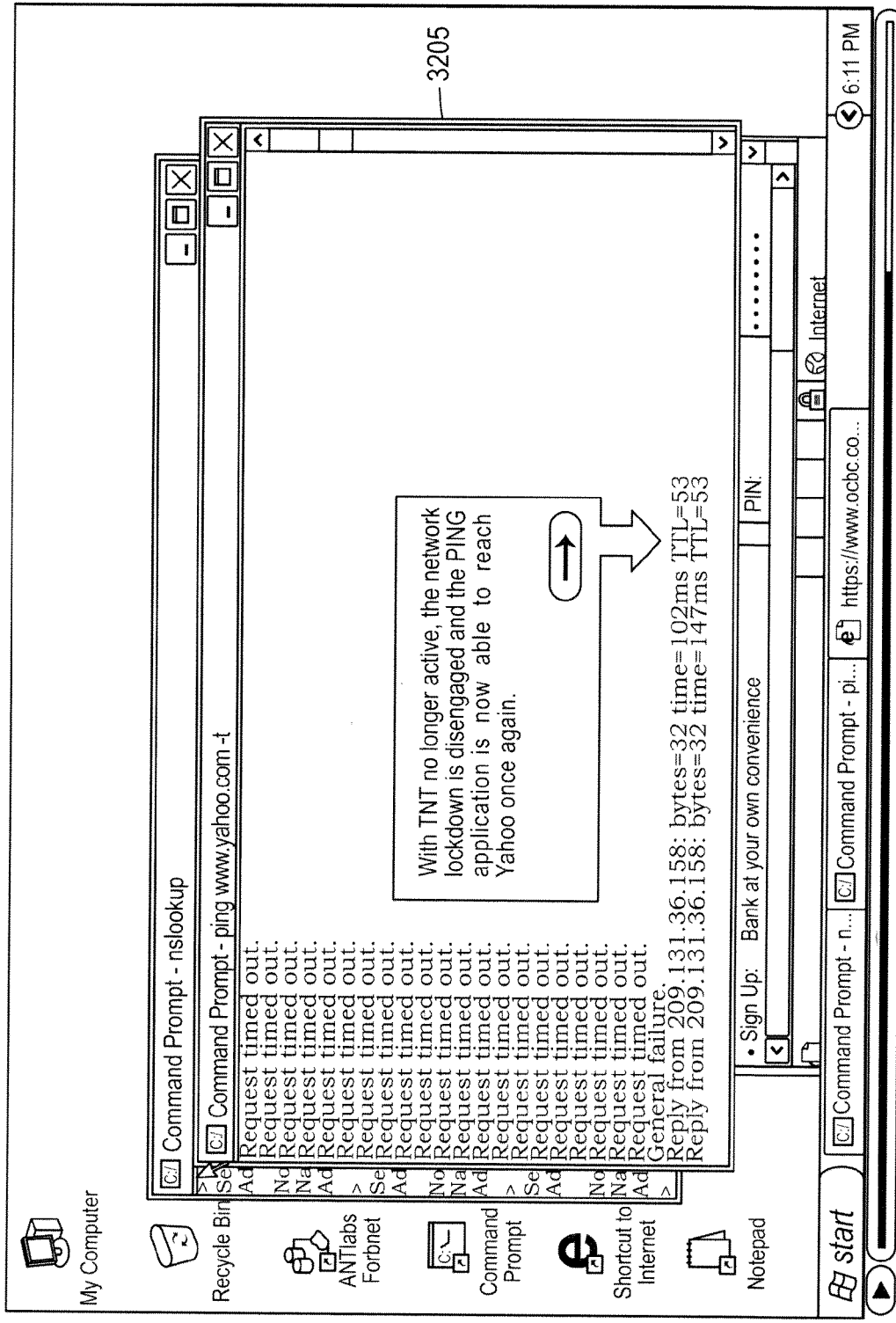
FIG. 32 is a screen shot of an end-user device with a window illustrating that outbound communication has resumed.

FIG. 32 is a screen shot of the desktop 805 on an end-user device 105 with a window 3205 illustrating that outbound communication has resumed.

Figure 33:
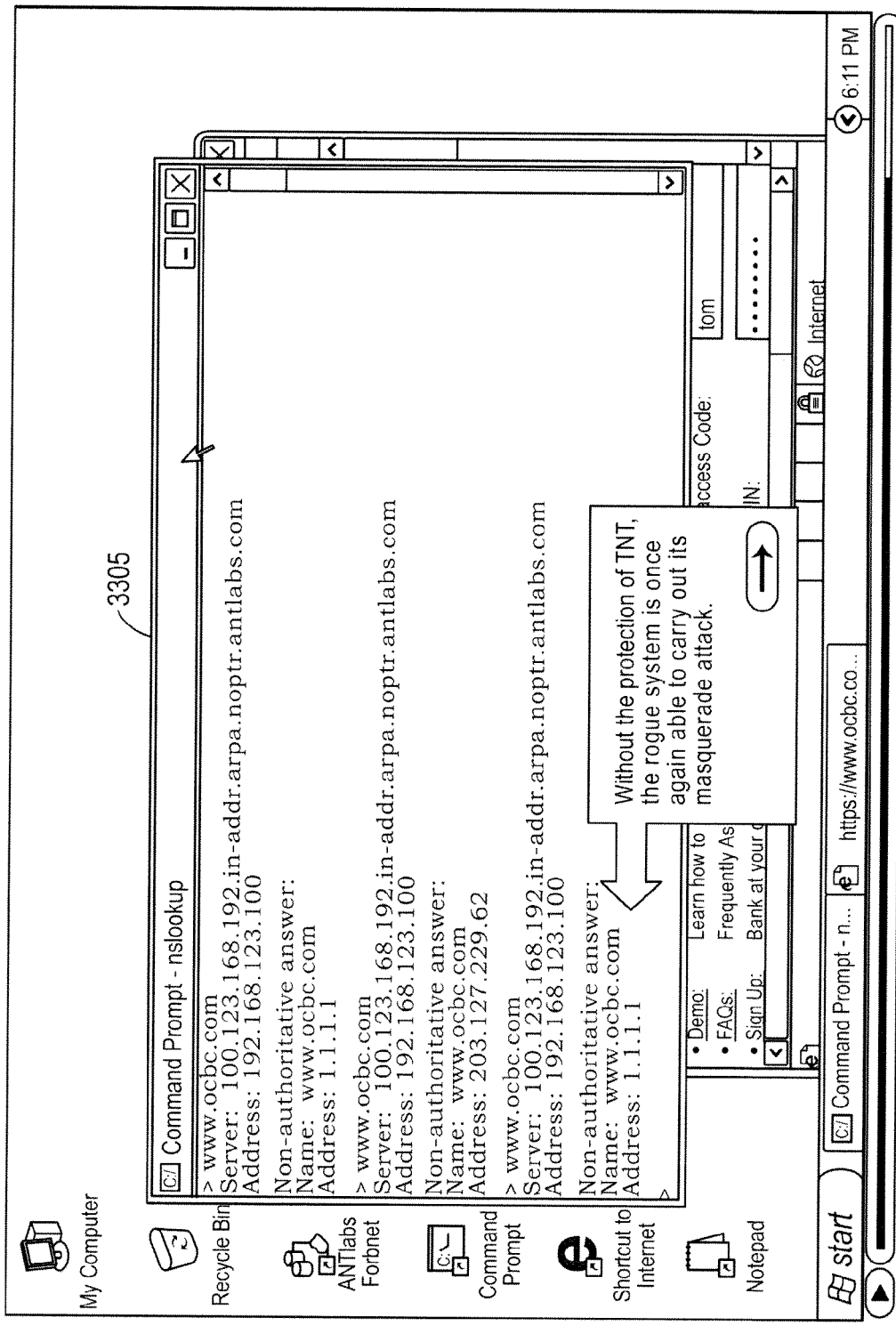
FIG. 33 is a screen shot of an end-user device with a window illustrating resumed vulnerability to the DNS poisoning of the DNS cache.

FIG. 33 is a screen shot of the desktop 805 on an end-user device 105 with a window 3305 illustrating resumed vulnerability to the DNS poisoning of the DNS cache.

Figure 34:
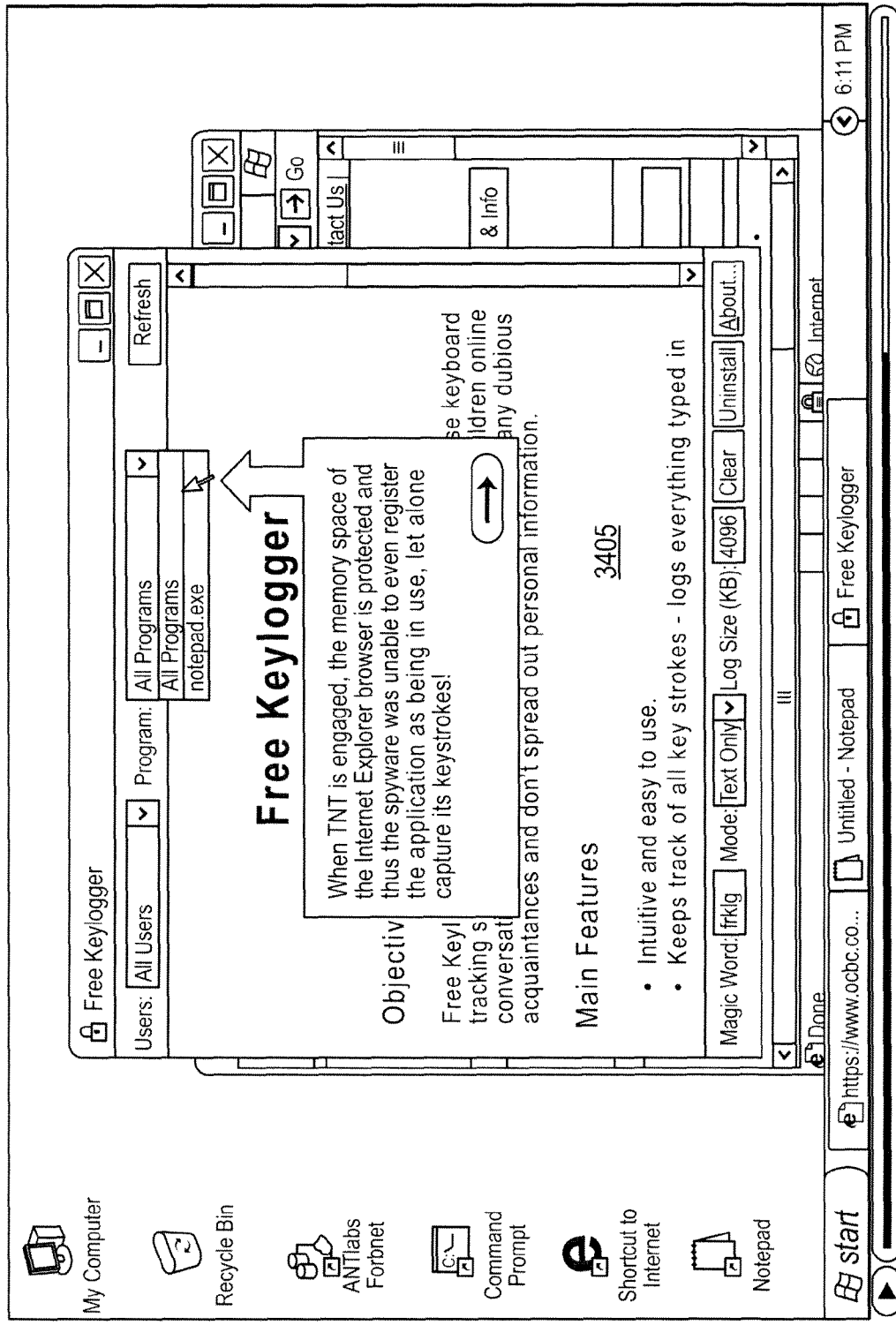
FIG. 34 is a screen shot of an end-user device with a window illustrating that the security engine protected the memory space from registering the browser window.

FIG. 34 is a screen shot of the desktop 805 on an end-user device 105 with a window 3405 illustrating that the security engine 177 protected the memory space from registering the browser window 2805.

Figure 35:
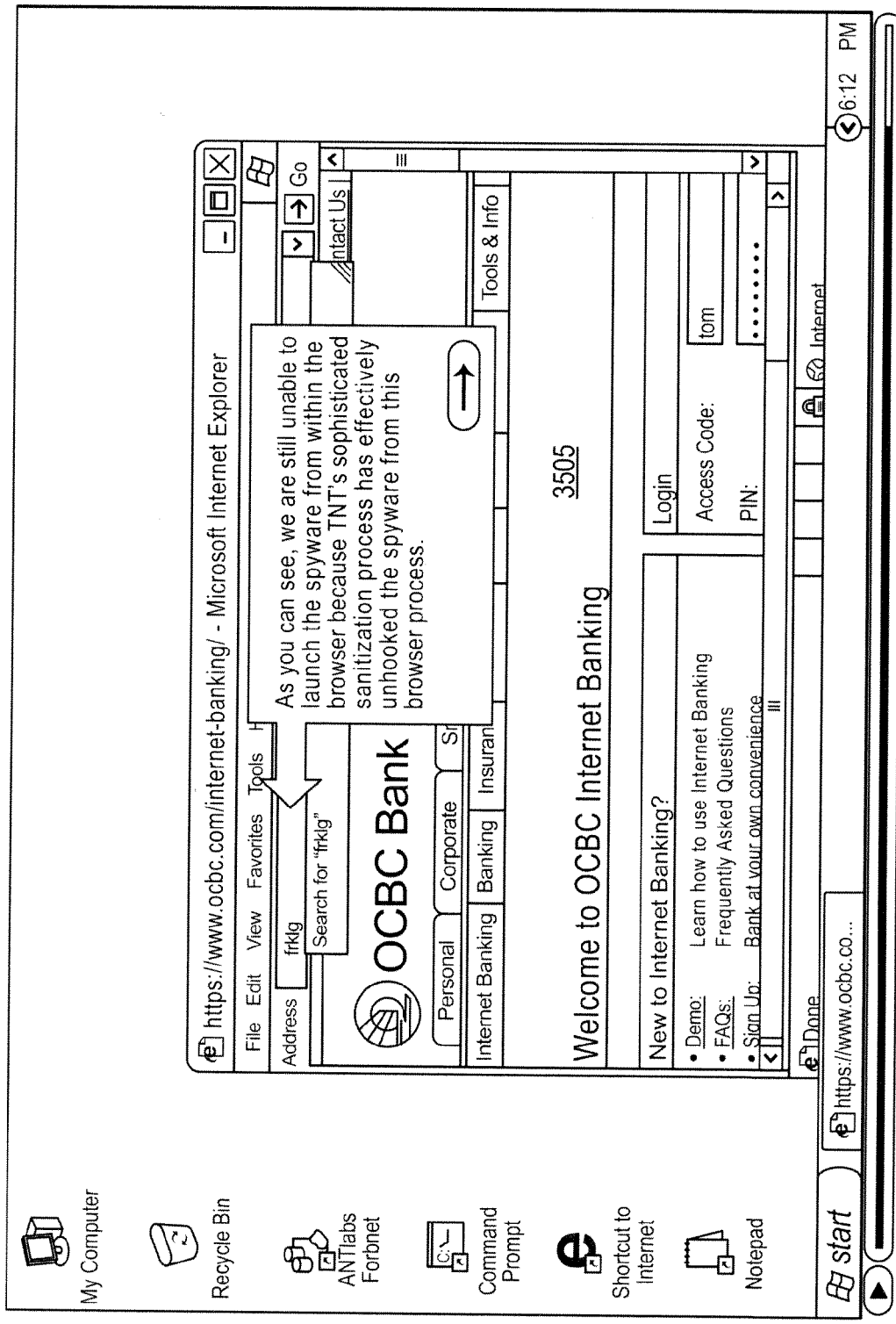
FIG. 35 is a screen shot of an end-user device with a window illustrating that the keylogger infection has been neutralized.

FIG. 35 is a screen shot of the desktop 805 on an end-user device 105 with a window 3505 illustrating that the keylogger infection has been permanently neutralized.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein maybe implemented utilizing hardware, software, or any desired combination thereof. For that matter, any type of logic may be utilized which is capable of implementing the various functions set forth herein. Components may be implemented using a programmed general-purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A network system comprising:
a server computer operative to provide a transaction with an end-user device over a transaction network;
an agent configured to operate on the end-user device operative to securely download a security mechanism from a trusted source to the end-user device to protect the end-user device during the transaction, the agent being pre-configured with a network address to a secure network address resolution service configured to provide an IP address of the trusted source; and
the security mechanism being configured to operate on the end-user device to at least partially protect the end-user device from malicious code, the malicious code being operative on the end-user device to attempt to capture confidential data presented during the transaction, the security mechanism being maintained by a party other than an end user of the end-user device, wherein the security mechanism being further configured operative to temporarily suspend an application that is not necessary for the transaction, and the temporary suspension being for the duration of the transaction.

2. The network system of claim 1, wherein the server computer is a banking site.

3. The network system of claim 1, wherein the server computer is a gaming site.

4. The network system of claim 1, wherein the trusted source resides on an ISP network.

5. The network system of claim 1, wherein the trusted source and the server computer is managed by the same entity.

6. The network system of claim 1, wherein the trusted source resides on the transaction network.

7. The network system of claim 1, wherein the security mechanism includes a security engine operative to temporarily suspend the application.

8. The network system of claim 1, wherein the security mechanism includes a security profile comprising identification information for the security mechanism.

9. The network system of claim 1, wherein the security mechanism includes a security engine and a security profile.

10. The network system of claim 1, wherein the security mechanism includes a start/stop trigger module for controlling when to initiate one or more aspects of the security mechanism and when to deactivate the one or more aspects of the security mechanism.

11. The network system of claim 1, wherein the security mechanism includes a file/network I/O control module for disabling at least one file or network operation during the transaction.

12. The network system of claim 1, wherein the security mechanism includes a trusted driver module for determining whether a driver on the end-user device matches a known trusted driver.

13. The network system of claim 12, wherein driver is a keyboard driver.

14. The network system of claim 1, wherein the security mechanism includes a keystrokes generator driver for generating additional keystrokes to a keystroke pattern generated by the end user.

15. The network system of claim 14, wherein the security mechanism includes a keystrokes deletion hook for deleting the additional keystrokes generated by the keystrokes generator driver.

16. The network system of claim 1, wherein the security mechanism includes an IP address to a server computer within the transaction network.

17. The network system of claim 1, wherein the security mechanism includes a VPN manager capable of establishing a secure tunnel between the end-user device and the transaction network.

18. The network system of claim 1, wherein the agent is capable of removing the security mechanism upon completion of the transaction.

19. The network system of claim 1, further comprising a second agent being capable of removing the security mechanism upon completion of the transaction.

20. The network system of claim 1, wherein the agent includes an install agent downloaded from the trusted source.

21. The network system of claim 1, wherein the agent includes an install agent downloaded from a third-party server.

22. The network system of claim 1, wherein the agent includes a connection agent preloaded onto the end-user device.

23. A method comprising:
requesting by an end-user device a secure transaction with a server computer operative to provide the secure transaction over a transaction network;
receiving by the end-user device an IP address of a trusted source from a secure network address resolution service at a network address, the end-user device being preconfigured with the network address of the secure network address resolution service and being operative to securely downloading a security mechanism from the trusted source to the end-user device;
receiving, from the trusted source, a security mechanism, the security mechanism being configured to operate on the end-user device to at least partially protect the end-user device from malicious code, the malicious code being operative on the end-user device to attempt to capture confidential data presented during the transaction, the security mechanism being maintained by a party other than an end user of the end-user device;
activating the security mechanism;
temporarily suspending, by the security mechanism, an application on the end-user device that is not necessary for the transaction, the temporary suspension being for the duration of the transaction;
establishing a secure connection between an end-user device and the server computer; and
enabling the transaction.

24. The method of claim 23, wherein the server computer is a banking site.

25. The method of claim 23, wherein the server computer is a gaming site.

26. The method of claim 23, wherein the trusted source resides on an ISP network.

27. The method of claim 23, wherein the trusted source and the server computer is managed by the same entity.

28. The method of claim 23, wherein the trusted source resides on the transaction network.

29. The method of claim 23, wherein the security mechanism includes a security engine operative to temporarily suspend the application.

30. The method of claim 23, wherein the security mechanism includes a security profile comprising identification information for the security mechanism.

31. The method of claim 23, wherein the security mechanism includes a security engine and a security profile.

32. The method of claim 23, wherein the security mechanism includes a start/stop trigger module for controlling when to initiate one or more aspects of the security mechanism and when to deactivate the one or more aspects of the security mechanism.

33. The method of claim 23, wherein the security mechanism includes a file/network I/O control module for disabling at least one file or network operation during the transaction.

34. The method of claim 23, wherein the security mechanism includes a trusted driver module for determining whether a driver on the end-user device matches a known trusted driver.

35. The method of claim 34, wherein driver is a keyboard driver.

36. The method of claim 23, wherein the security mechanism includes a keystrokes generator driver for generating additional keystrokes to a keystroke pattern generated by the end user.

37. The method of claim 36, wherein the security mechanism includes a keystrokes deletion hook for deleting the additional keystrokes generated by the keystrokes generator driver.

38. The method of claim 23, wherein the security mechanism includes an IP address to a server within the transaction network.

39. The method of claim 23, wherein the security mechanism includes a VPN manager capable of establishing a secure tunnel between the end-user device and the transaction network.

40. The method of claim 23, further comprising removing the security mechanism upon completion of the transaction.

* * * * *

UNITED STATES PATENT AND TRADEMARK OFFICE
CERTIFICATE OF CORRECTION

| | | |
|---|---|---|
| PATENT NO. | : 8,434,148 B2 | Page 1 of 1 |
| APPLICATION NO. | : 11/694476 | |
| DATED | : April 30, 2013 | |
| INVENTOR(S) | : Wee Tuck Teo | |

It is certified that error appears in the above-identified patent and that said Letters Patent is hereby corrected as shown below:

In the Claims:

Claim 1 column 21, lines 63-64:
"an agent configured to operate on the end-user device operative to securely download" should read
-- an agent configured to operate on the end-user device to securely download --.

Claim 1 column 22, lines 9-11:
"wherein the security mechanism being further configured operative to temporarily suspend" should read -- the security mechanism being further configured to temporarily suspend --.

Signed and Sealed this
Second Day of July, 2013

Teresa Stanek Rea
*Acting Director of the United States Patent and Trademark Office*